United States Patent
Kawamori

(10) Patent No.: US 10,153,953 B2
(45) Date of Patent: Dec. 11, 2018

(54) NETWORK SYSTEM, CONTROL METHOD OF A NETWORK SYSTEM AND CONTROL DEVICE

(71) Applicant: Seiko Epson Corporation, Tokyo (JP)

(72) Inventor: Takashi Kawamori, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 211 days.

(21) Appl. No.: 15/190,319

(22) Filed: Jun. 23, 2016

(65) Prior Publication Data

US 2016/0380849 A1    Dec. 29, 2016

(30) Foreign Application Priority Data

Jun. 26, 2015  (JP) ................. 2015-128463
Jun. 26, 2015  (JP) ................. 2015-128464

(51) Int. Cl.
| | |
|---|---|
| *H04L 29/08* | (2006.01) |
| *H04L 12/26* | (2006.01) |
| *G06Q 10/10* | (2012.01) |
| *G06Q 20/20* | (2012.01) |
| *H04L 12/24* | (2006.01) |
| *H04L 29/06* | (2006.01) |

(52) U.S. Cl.
CPC .......... *H04L 43/04* (2013.01); *G06Q 10/10* (2013.01); *G06Q 20/202* (2013.01); *H04L 41/04* (2013.01); *H04L 67/42* (2013.01)

(58) Field of Classification Search
CPC ........................................... H04L 43/04
USPC ...................................... 709/224
See application file for complete search history.

(56) References Cited

U.S. PATENT DOCUMENTS

| | | | |
|---|---|---|---|
| 6,754,704 B1 | 6/2004 | Prorock | |
| 8,654,360 B2 * | 2/2014 | Hatano | H04N 1/00326 358/1.13 |
| 2002/0095495 A1 | 7/2002 | Otsuka et al. | |
| 2015/0188784 A1 * | 7/2015 | Yin | H04L 63/0281 709/224 |

FOREIGN PATENT DOCUMENTS

| | | |
|---|---|---|
| JP | 2003-271238 A | 9/2003 |
| JP | 2007-156524 A | 6/2007 |
| JP | 2010-211422 A | 9/2010 |

* cited by examiner

*Primary Examiner* — Adnan M Mirza
(74) *Attorney, Agent, or Firm* — Nutter McClennen & Fish LLP

(57) ABSTRACT

A POS terminal 13 generates log data D11 containing status information data indicating the status of a log item targeted for monitoring at a predetermined interval, sends the generated log data D11 as a request to a maintenance server 17, and changes the interval for generating the request data D1 or the interval for transmitting the log data D11 according to a specific condition.

15 Claims, 22 Drawing Sheets

FIG.6A | COMMUNICATION ERROR STATUS IDENTIFICATION INFORMATION | COMMUNICATION ERROR STATUS INFORMATION

FIG.6B | PRINTER ERROR STATUS IDENTIFICATION INFORMATION | PRINTER ERROR STATUS INFORMATION

FIG.6C | RAM USAGE STATUS IDENTIFICATION INFORMATION | RAM USAGE STATUS INFORMATION

FIG.6D | CPU USAGE STATUS IDENTIFICATION INFORMATION | CPU USAGE STATUS INFORMATION

FIG.6E | CPU TEMPERATURE STATUS IDENTIFICATION INFORMATION | CPU TEMPERATURE STATUS INFORMATION

FIG.6F | DATA TRANSMISSION RATE STATUS IDENTIFICATION INFORMATION | DATA TRANSMISSION RATE STATUS INFORMATION

FIG.6G | ACTUAL SSD USE STATUS IDENTIFICATION INFORMATION | ACTUAL SSD USE STATUS INFORMATION | SSD LIFE INFORMATION

FIG.6H | CUMULATIVE PRINTHEAD LINE COUNT STATUS IDENTIFICATION INFORMATION | CUMULATIVE PRINTHEAD LINE COUNT STATUS INFORMATION | REMAINING USABLE PRINTHEAD DAYS INFORMATION

FIG.6I | CUMULATIVE CUTTER OPERATION COUNT STATUS IDENTIFICATION INFORMATION | CUMULATIVE CUTTER OPERATION COUNT STATUS INFORMATION | REMAINING USABLE CUTTER DAYS INFORMATION

FIG.6J | OPERATING PROCESS STATUS IDENTIFICATION INFORMATION | OPERATING PROCESS STATUS INFORMATION

FIG.6K | CONNECTED DEVICE STATUS IDENTIFICATION INFORMATION | CONNECTED DEVICE STATUS INFORMATION

```
A1 ⎰ <STORE ID>···</>
   ⎱ <POS TERMINAL ID>···</>

<PROCESS RESULT REPORT DATA>
          <PROCESS A>···</>
A2 ⎰    <PROCESS B>···</>
          <PROCESS C>···</>
     </>

<MAIN LOG INFORMATION>
A31 ⎰ <POS TERMINAL ID>···</>
          <STATUS INFORMATION>
     A321 ⎰<STATUS IDENTIFICATION
              ⎱INFORMATION>···</>
                <STATUS STATE INFORMATION>···</>
                         ⋮
          </>
A3
     A32   <STATUS INFORMATION>
          A321 ⎰<STATUS IDENTIFICATION
                    ⎱INFORMATION>···</>
                <STATUS STATE INFORMATION>···</>
                         ⋮
          </>
                         ⋮
     </>

<SUB LOG INFORMATION>
A41 ⎰ <POS TERMINAL ID>···</>
          <STATUS INFORMATION>
     A421 ⎰<STATUS IDENTIFICATION
              ⎱INFORMATION>···</>
                <STATUS STATE INFORMATION>···</>
                         ⋮
          </>
A4
     A42   <STATUS INFORMATION>
          A421 ⎰<STATUS IDENTIFICATION
                    ⎱INFORMATION>···</>
                <STATUS STATE INFORMATION>···</>
                         ⋮
          </>
                         ⋮
     </>
```

FIG. 7

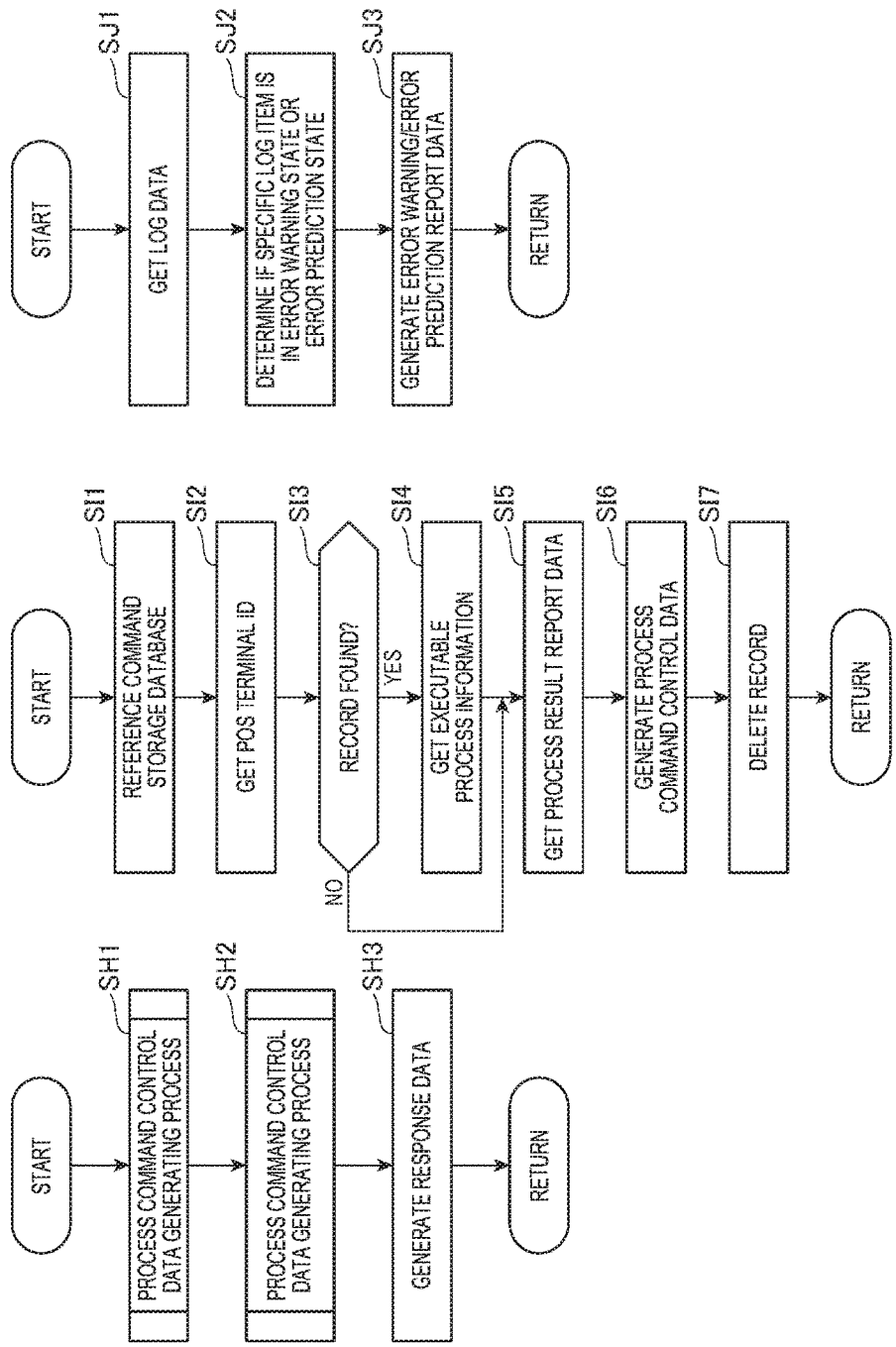

FIG.11A

| STORE ID | POS TERMINAL ID | RAM USAGE STATUS INFORMATION DATA |

FIG.11B

| STORE ID | POS TERMINAL ID | COMMUNICATION ERROR STATUS INFORMATION DATA | CLASS INFORMATION (CLASS INFORMATION INDICATING AN ERROR STATE) |

FIG.11C

| STORE ID | POS TERMINAL ID | RAM USAGE STATUS INFORMATION DATA | CLASS INFORMATION |

FIG.11D

| STORE ID | POS TERMINAL ID | OPERATING PROCESS STATUS INFORMATION DATA | CLASS INFORMATION |

| STORE ID | POS TERMINAL ID | POWER SUPPLY STATE INFORMATION |
|---|---|---|
| | | |

FIG. 14

NETWORK SYSTEM, CONTROL METHOD OF A NETWORK SYSTEM AND CONTROL DEVICE

CROSS-REFERENCE TO RELATED APPLICATIONS

The present invention claims benefit from Japanese Application Nos. 2015-128463 filed on Jun. 26, 2015 and 2015-128464 filed on Jun. 26, 2015, which are hereby incorporated herein by reference in their entireties.

BACKGROUND

1. Technical Field

The present disclosure relates to a network system, a control method of a network system and a control device.

2. Related Art

Network systems (remote maintenance systems) in which log data (monitor logs and error data) is sent from a control device (a customer monitoring client) to a server (a monitoring server) are known from the literature. See, for example, JP-A-2003-271238.

In systems in which a log data is sent to a server from a control device that is a client of the server as in the network system in JP-A-2003-271238, the ability to execute processes that are compatible with the configurations in which log data is sent from control devices to a server is desirable.

Network systems such as described above in which a client control device and a server communicate with each other, and the control device uses functions of the server also desirably enable the control device to use functions of the server only during a specific period specified in a contract in which such use is previously enabled by the contract. There is also a need in such a system to execute an appropriate process when the control device tries to use functions of the server during non-contract periods, that is, periods that are not specified by the contract.

SUMMARY

A system according to the disclosure in which a control device sends log data to a server enables executing a process compatible with a configuration in which a control device sends log data to a server.

A system according to the disclosure in which the time (period) during which a control device can use functions of a server is defined by a contract enables executing a process for handling events in which the control device wants to use functions of the server at times other than the contract period.

A network system according to the disclosure includes a control device configured to transmit a request, and a server connecting to the control device through a network and configured to transmit a response to a received request. The control device generates log data containing status information expressing the status of a log item targeted for monitoring the status thereof based on a predetermined interval, transmits the generated log data as the request to the server at a predetermined interval, and changes according to a specific condition the predetermined interval to another interval for generating or transmitting the log data.

In a network system according to another aspect of the disclosure, when the specific condition is that the possibility of the log item becoming an error is high, the control device sets the interval for transmitting the log data shorter than the predetermined interval.

Another aspect of the disclosure is a control method of a network system including a control device configured to transmit a request, and a server connecting to the control device through a network and configured to transmit a response to a received request, the control method including: the control device generating log data containing status information expressing the status of a log item targeted for monitoring the status thereof based on a predetermined interval; transmitting the generated log data as the request to the server; and changing according to a specific condition to another interval for generating or transmitting the log data.

In a network system according to another aspect of the disclosure, when the possibility of the status of the specific log item becoming an error is high, setting the interval for transmitting the log data shorter than the predetermined interval.

In a network system according to another aspect of the disclosure, the server stores contract period information indicating a period determined by contract in which the control device can use a function of the server. When log data is received, the server determines based on the contract period information of the control device whether or not the current time is within the period indicated by the contract period information. If not within the period indicated by the contract period information, the server sends to the control device a response including information indicating not being in the period indicated by the contract period information. If within the period indicated by the contract period information, the server sends to the control device a response including information indicating being in the period indicated by the contract period information. When receipt of a response including information indicating not being in the period indicated by the contract period information is the specific condition, the control device sets the interval for transmitting the log data longer than the predetermined interval.

Other objects and attainments together with a fuller understanding of the disclosure will become apparent and appreciated by referring to the following description and claims taken in conjunction with the accompanying drawings.

BRIEF DESCRIPTION OF THE DRAWINGS

FIGS. 6A-6K illustrate the content of status information data.

FIG. 7 shows an example of request data.

FIGS. 8A, 8B and 8C are flow charts showing operations of the maintenance server.

FIGS. 11A-11D show the structure of records stored in a first status information database and a second status information database.

FIG. 14 shows the structure of a record stored in a power supply status monitoring database.

DESCRIPTION OF EMBODIMENTS

A preferred embodiment of the present disclosure is described below with reference to the accompanying figures.

Figure 1:
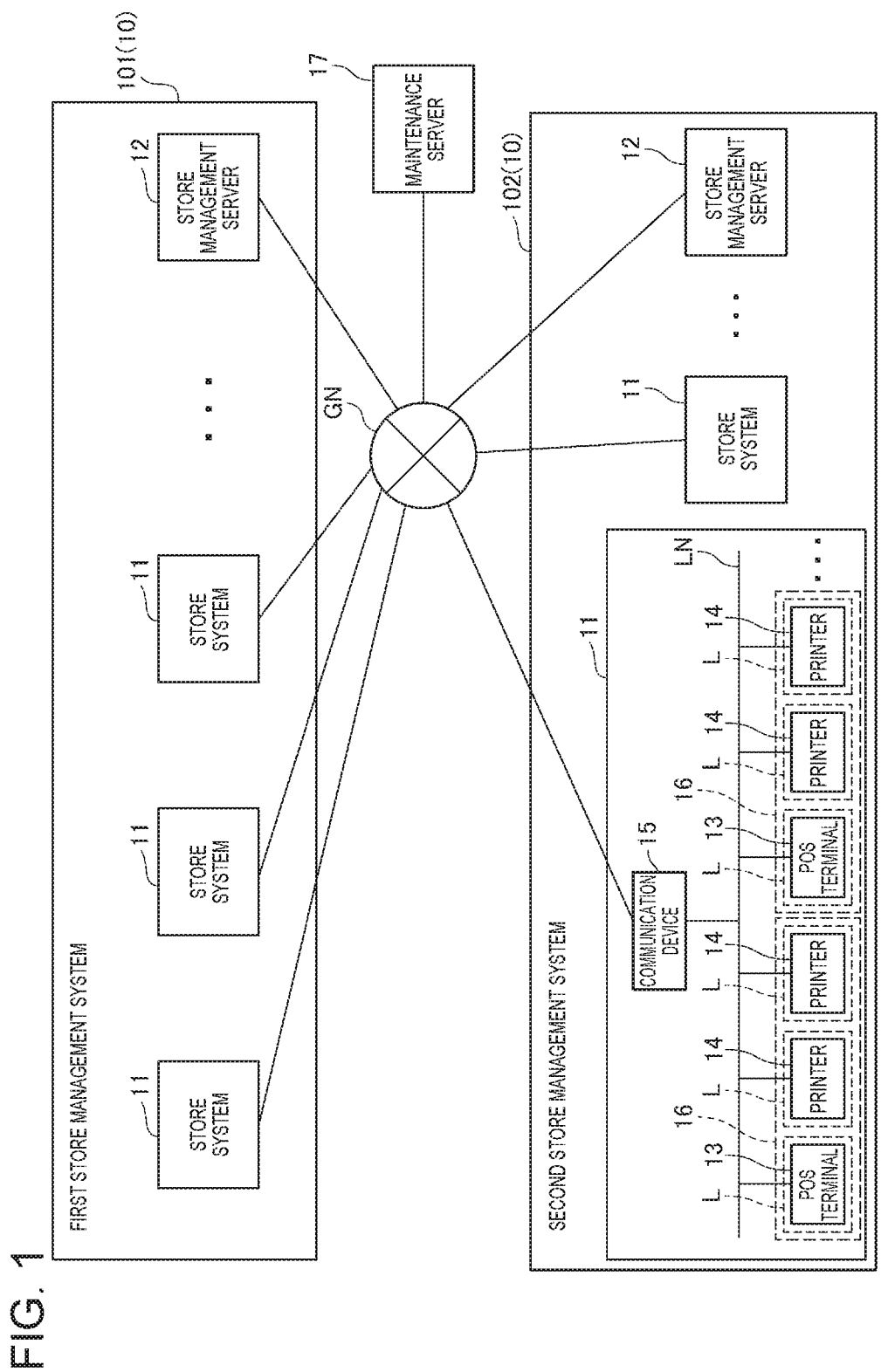
FIG. 1 illustrates the configuration of a network system according to the disclosure.

FIG. 1 illustrates the configuration of a network system 1 according to this embodiment of the disclosure.

As shown in FIG. 1, the network system 1 includes multiple store management systems 10 (two in the example shown in FIG. 1, first store management system 101 and second store management system 102).

The store management system 10 is a system used by a corporation that operates such businesses as supermarkets, convenience stores, department stores, or restaurants. In FIG. 1, the first store management system 101 is a system used by company K1, and the second store management system 102 is a system used by company K2. Company K1 and company K2 are completely independent companies with no business ties therebetween, and the first store management system 101 and the second store management system 102 do not exchange information with each other.

In this embodiment of the disclosure, a store performs an operation of selling merchandise. However, a store as used herein is not limited to selling merchandise, and may sell food and drink or a specific service, and may perform any operation where sales transaction is made. The main entity using a store management system 10 according to this embodiment of the disclosure may be a corporation. The store management system 10 is not limited to be used by corporations, however.

The store management system 10 includes at least one store system 11 and a store management server 12. The store system 11 and the store management server 12 are connected and communicate through a global network GN such as the Internet.

The store system 11 is a system installed in an individual store, and performs a function for processing transactions and a function for producing transaction receipts as described further below.

A checkout counter L where customer transactions are processed is located in the business where the store system 11 is deployed. A POS terminal 13 (control device) that can produce receipts appropriate to the transaction is installed at each checkout counter L. The receipt produced by the POS terminal 13 and a printer 14 is then given to the customer by the checkout clerk.

The configuration and functions of the POS terminal 13 and printer 14, and processes based on the functions of the POS terminal 13 and printer 14, are described further below.

The store system 11 also has a local area network LN.

The POS terminal 13 and printer 14 connect to the local area network LN according to a communication protocol appropriate to the LN. Any suitable communication protocol may be used by the POS terminal 13 and printer 14 to connect to the local area network LN, and a wired or wireless connection may be used.

A communication device 15 is also connected to the local area network LN. The communication device 15 is an interface device that connects the local area network LN to a global network GN. The communication device 15 has the functions of a modem, ONU (Optical Network Unit), a router, a DHCP (Dynamic Host Configuration Protocol) server, or a NAT (Network Address Translation) unit, for example. The communication device 15 passes data between devices when a device connected to the local area network LN and a device connected to the global network GN communicate with each other. Note that the communication device 15 is represented by a single function block in FIG. 1, but the communication device 15 may comprise plural devices with different functions.

The POS terminal 13 and printer 14 communicate with each other through the local area network LN.

The POS terminal 13 can also access the global network GN through the communication device 15 on the local area network LN, and communicate with devices connected to the global network GN.

The printer 14 does not have a function for accessing the global network GN.

The store system 11 in this example has a POS unit 16 comprising one POS terminal 13 and zero or more (there may be 0, 1, 2, or more) printers 14.

For convenience of description below, a POS unit 16 in this embodiment of the disclosure has one or more printers 14.

As described further below, the one POS terminal 13 in the POS unit 16 controls the one or more printers 14 of that one POS unit 16.

The store management server 12 is a cloud server in a cloud system in which the POS terminal 13 and other devices are clients.

The configuration and functions of the store management server 12, and processes based on the functions of the store management server 12, are described further below.

As shown in FIG. 1, a maintenance server 17 (server) is connected to the global network GN. The maintenance server 17 is a cloud server in a cloud system in which the POS terminal 13 and other devices are clients.

The configuration and functions of the maintenance server 17, and processes based on the functions of the maintenance server 17 are described further below.

Note that the store management server 12 and maintenance server 17 are represented by a single function block respectively in FIG. 1, but this does not mean the store management server 12 and maintenance server 17 are embodied by a single server device. For example, the store management server 12 or maintenance server 17 may be embodied by a plurality of server devices.

Figure 2:
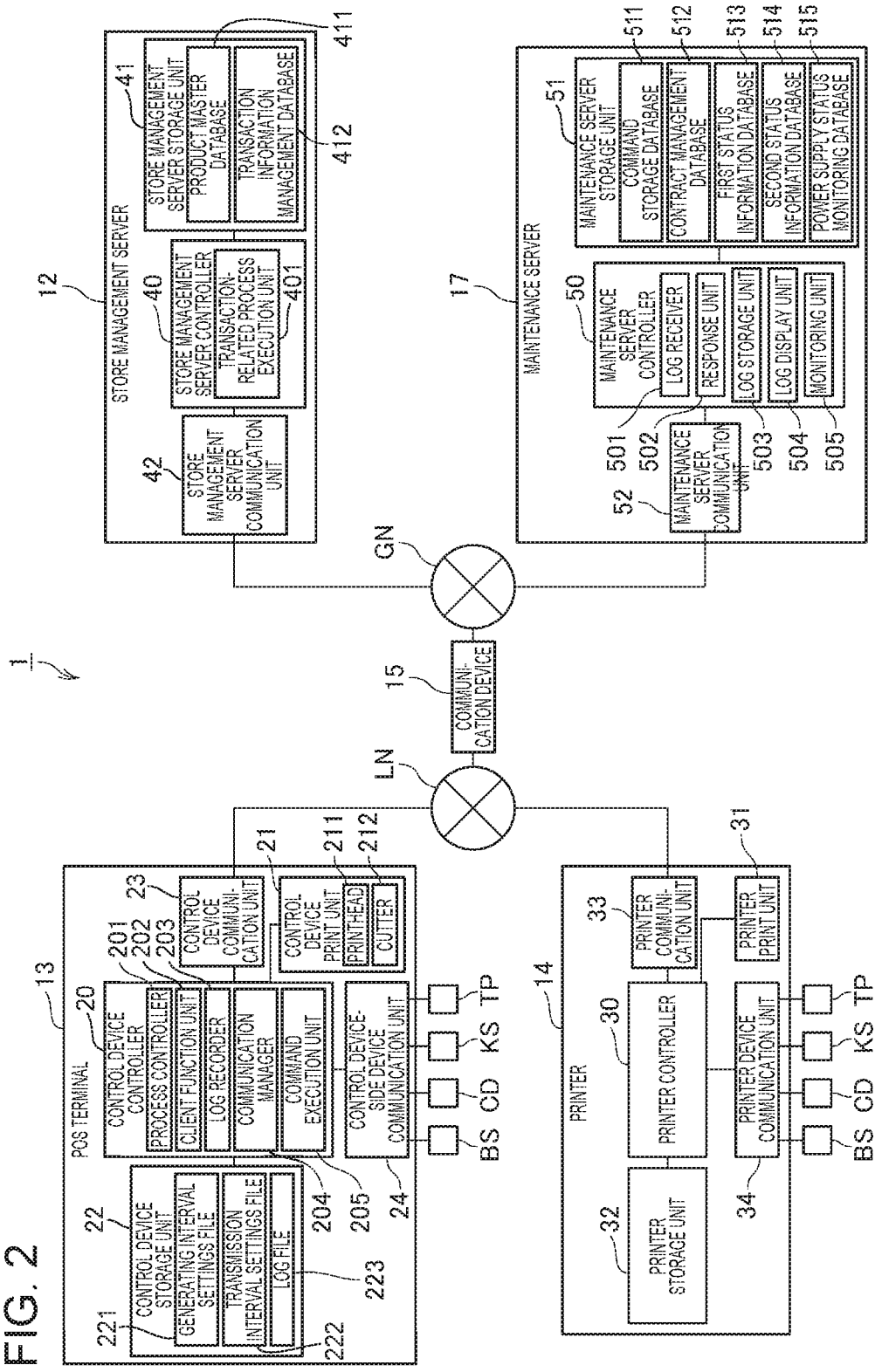
FIG. 2 is a block diagram illustrating the functional configuration of devices in the network system.

FIG. 2 is a block diagram showing the functional configuration of a POS terminal 13, printer 14, store management server 12, and maintenance server 17 in the network system 1.

The POS printer 14 can be a thermal line printer that stores roll paper (recording medium) and records images by forming dots with a thermal line head on the roll paper.

As shown in FIG. 2, the POS terminal 13 has a control device controller 20, a control device print unit 21, a control device storage unit 22, a control device communication unit 23 (communication unit), and a control device-side device communication unit 24.

The control device controller 20 has a CPU, ROM, RAM, and other peripheral circuits not shown, and controls the POS terminal 13.

The control device controller 20 includes a process controller 201, a client function unit 202, a log recorder 203, a communication manager 204, and a command execution unit 205.

The process controller 201 is a function block embodied by executing a process based on firmware installed on the POS terminal 13 and associated programs.

The client function unit 202 is also a function block embodied by executing a process based on a web browser installed on the POS terminal 13 and associated programs.

The log recorder 203, communication manager 204, and execution unit 205 are also function blocks embodied by executing processes based on specific software installed on the POS terminal 13 and associated programs.

The control device print unit 21 includes a conveyance mechanism for conveying roll paper stored inside the cabinet of the POS terminal 13, a printhead 211, and a cutter 212.

The conveyance mechanism has a platen roller (not shown) disposed at a position opposite the printhead 211, holds the roll paper with the printhead 211 and the platen roller, and turns the platen roller in a specific direction to convey the roll paper in the conveyance direction.

The printhead 211 is a thermal head having a plurality of heat elements corresponding to the print resolution disposed in a direction intersecting the conveyance direction of the roll paper, and forms dots on the thermal roll paper by heating the heat elements.

The control device print unit 21 prints images by alternately forming one line (a row of heat elements extending in the direction intersecting the conveyance direction) of dots with the printhead 211, and then advancing the roll paper the distance of one line by the conveyance mechanism.

The cutter 212 has a fixed knife and a movable knife, and cuts the roll paper by moving the movable knife relative to the fixed knife so that the cutting edge of the movable knife slides against the cutting edge of the fixed knife.

The control device print unit 21 produces a receipt by the control device controller 20 controlling conveyance of the roll paper by the conveyance mechanism, printing an image of the receipt on the roll paper by the printhead 211, and then cutting the roll paper at a specific position by the cutter 212.

The control device storage unit 22 has nonvolatile memory and stores data.

The control device storage unit 22 in this example is a solid state drive (SSD), and can store data in the flash memory of the SSD (referred to below as simply SSD).

The control device storage unit 22 stores a generating interval settings file 221, a transmission interval settings file 222, and a log file 223. The information stored in these files is described below.

The control device communication unit 23 accesses the local area network LN and communicates with other devices (including the POS terminal 13 and printer 14) connected to the local area network LN as controlled by the control device controller 20.

The control device communication unit 23 also accesses the global network GN through the communication device 15 on the local area network LN, and communicates with other devices connected to the global network GN, as controlled by the control device controller 20.

The control device-side device communication unit 24 has an interface board with communication ports such as a USB port, a port conforming to a non-USB serial communication standard, or a port conforming to another communication protocol. The control device-side device communication unit 24 communicates with devices connected to the corresponding ports as controlled by the control device controller 20. Note that the control device-side device communication unit 24 may also be configured with a wireless communication function and communicate with devices wirelessly.

In the example shown in FIG. 2, a barcode scanner BS, customer display CD, cash drawer KS, and touch panel TP are examples of devices that connect to the POS terminal 13 through the interface board of the control device-side device communication unit 24.

The barcode scanner BS is used to read barcodes from products and product packaging, and outputs data representing the barcode to the control device-side device communication unit 24. The control device-side device communication unit 24 then outputs the data input from the barcode scanner BS to the control device controller 20.

The customer display CD is an LCD or other type of display device, and displays images as controlled by the control device controller 20. The information presented on the customer display CD can be read by the customer involved in the transaction at the checkout counter L.

The cash drawer KS has a tray for storing cash, and a mechanism for locking the tray, and unlocks and opens the tray as controlled by the control device controller 20.

The touch panel TP has a display device such as an LCD panel or OLED panel, and a touch sensor disposed over the display device for detecting touch operations by the user (including the checkout clerk). The touch panel TP is disposed to a position at the checkout counter L where it can be read by the checkout clerk and operated by touch. The touch panel TP displays images on the display device as controlled by the control device controller 20. The client function unit 202 of the control device controller 20 can display a web page on the touch panel TP based on an HTML file acquired by a specific means. When a touch operation by the user is detected, the touch panel TP outputs a signal indicating the touched position to the control device controller 20. Based on input from the touch panel TP, the control device controller 20 executes a process corresponding to the touch operation of the user.

The printer 14 is a thermal line printer that stores roll paper and prints images by forming dots on the roll paper with a thermal line head.

As shown in FIG. 2, the printer 14 includes a printer controller 30, a printer print unit 31, a printer storage unit 32, a printer communication unit 33, and a printer device communication unit 34.

The printer controller 30 includes a CPU, ROM, RAM, and other peripheral circuits not shown, and controls the printer 14.

The printer print unit 31 includes a conveyance mechanism for conveying roll paper stored inside the cabinet of the printer 14, a printhead, and a cutter.

The printer storage unit 32 includes EEPROM or other type of nonvolatile memory, and stores data.

The printer communication unit 33 accesses the local area network LN and communicates with devices connected to the local area network LN (including the POS terminal 13 and other printers 14) as controlled by the printer controller 30.

The printer device communication unit 34 has an interface board with a USB port, a port conforming to a non-USB serial communication standard, or ports conforming to other communication protocols. The printer device communication unit 34 communicates with devices connected to the appropriate ports as controlled by the printer controller 30. Note that the printer device communication unit 34 may also be configured with a wireless communication function and communicate with devices wirelessly. In the example shown in FIG. 2, a barcode scanner BS, customer display CD, cash drawer KS, and touch panel TP are examples of devices that connect to the printer 14.

As shown in FIG. 2, the store management server 12 has a store management server controller 40, a store management server storage unit 41, and a store management server communication unit 42.

The store management server controller 40 includes a CPU, ROM, RAM, and other peripheral circuits not shown, and controls the store management server 12.

The store management server controller 40 includes a transaction-related process execution unit 401.

The transaction-related process execution unit 401 is a function block that executes specific processes based on a specific web application and associated programs run by server software installed on the store management server 12.

The store management server storage unit 41 comprises nonvolatile memory such as a hard disk drive or EEPROM device not shown, and stores data.

The store management server storage unit 41 also stores a product master database 411. The product master database 411 relationally stores a product code, price, and other product-related information for products sold in the business.

The store management server storage unit 41 stores a transaction information management database 412. The transaction information management database 412 is described further below.

As shown in FIG. 2, the maintenance server 17 has a maintenance server controller 50 (server control unit), a maintenance server storage unit 51 (server storage unit), and a maintenance server communication unit 52.

The maintenance server controller 50 includes a CPU, ROM, RAM, and other peripheral circuits not shown, and controls the maintenance server 17.

The maintenance server controller 50 includes a log receiver 501, a response unit 502, a log storage unit 503, a log display unit 504, and a monitoring unit 505.

The log receiver 501, response unit 502, log storage unit 503, log display unit 504, and monitoring unit 505 are function blocks that execute specific processes based on a specific web application and associated programs run by server software installed on the maintenance server 17.

The maintenance server storage unit 51 has nonvolatile memory such as a hard disk drive or EEPROM device not shown, and stores data.

The maintenance server storage unit 51 stores a command storage database 511, a contract management database 512, a first status information database 513, a second status information database 514, and a power supply status monitoring database 515. These databases are described further below.

The maintenance server communication unit 52 accesses the global network GN and communicates with devices connected to the network (including the POS terminal 13) as controlled by the maintenance server controller 50.

As described above, the network system 1 has a maintenance server 17.

The maintenance server 17 manages the status of the POS terminals 13 and printers 14 of the store systems 11 in a store management system 10 regardless of the company (entity) using the store management system 10 based on a prior contract with that company.

In this embodiment of the disclosure, company K1 and company K2 have previously contracted with the operator of the maintenance server 17 for management of the POS terminals 13 and printers 14 by the maintenance server 17, and the maintenance server 17 centrally manages the status of the POS terminals 13 and printers 14 in the store systems 11 of a first store management system 101, and the status of the POS terminals 13 and printers 14 in the store systems 11 of a second store management system 102.

The maintenance server 17 also provides information useful for maintaining the POS terminals 13 and printers 14 to the person (referred to below as the maintenance technician) responsible for maintaining the POS terminals 13 and printers 14 in each store system 11.

The operation of the maintenance server 17 during maintenance of the POS terminals 13 and printers 14 is described next.

Figure 3:
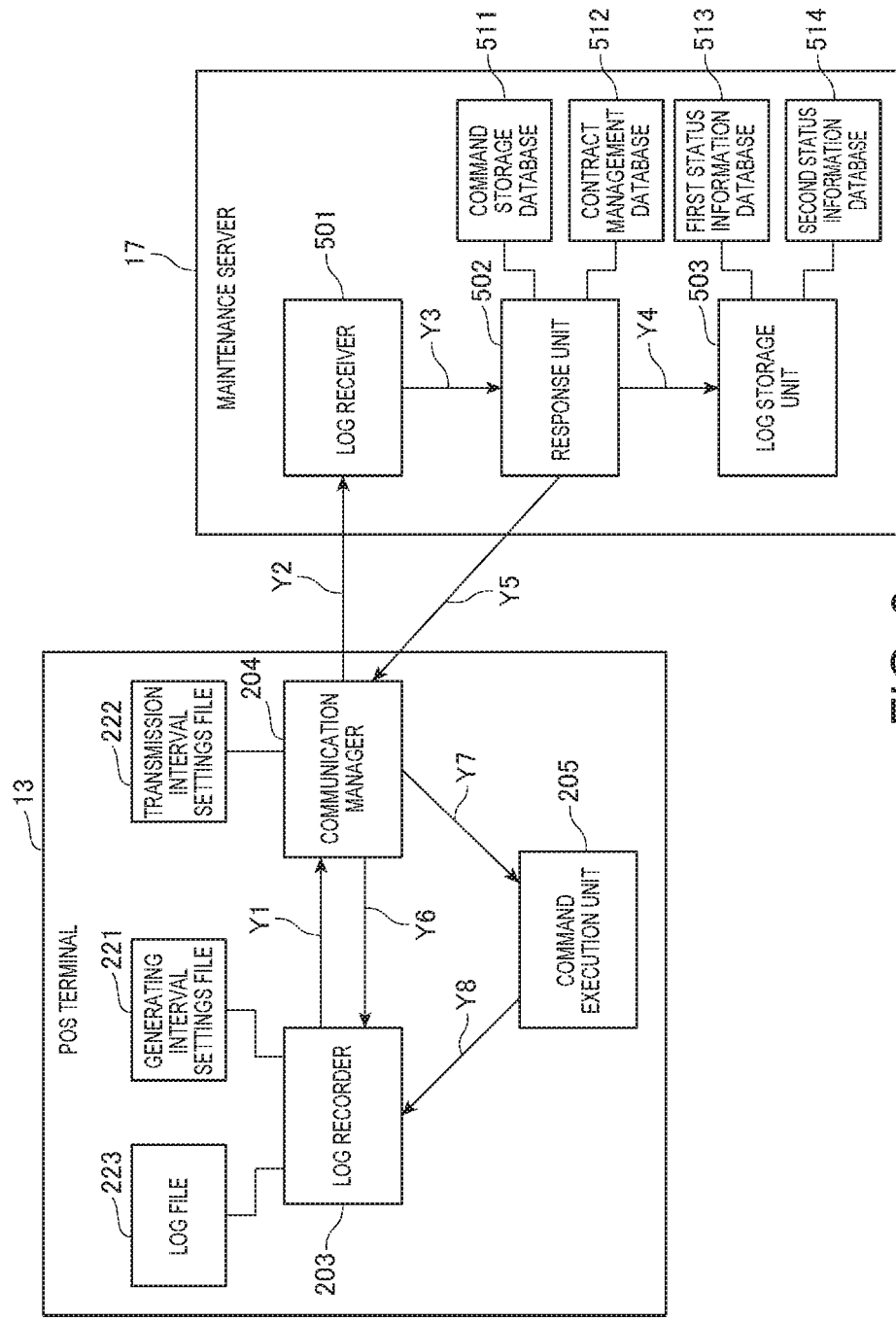
FIG. 3 is a block diagram of the POS terminal and maintenance server.

FIG. 3 shows the function blocks of the control device controller 20 of the POS terminal 13 together with the data stored by the control device storage unit 22, and shows the function blocks of the maintenance server controller 50 of the maintenance server 17 together with the data stored by the maintenance server storage unit 51.

The basic flow of data sent and received between the function blocks when the maintenance server 17 manages the status of the POS terminals 13 and printers 14 is described first with reference to FIG. 3. Details of the processes executed by the function blocks, and details of the content of the data sent and received between the function blocks, are omitted in the following description referring to FIG. 3.

As shown in FIG. 3, the log recorder 203 of the POS terminal 13 references the generating interval settings file 221 and generates (or sends) request data D1 at an interval defined in the generating interval settings file 221.

The request data D1 includes log data D11, and process result report data D12.

The log recorder 203 outputs the generated request data D1 to the communication manager 204 (arrow Y1 in FIG. 3).

The communication manager 204 references the transmission interval settings file 222 and sends the request data D1 input from the log recorder 203 to the maintenance server 17 at the interval set in the transmission interval settings file 222 (arrow Y2 in FIG. 3).

The request data D1 that the communication manager 204 sends to the maintenance server 17 at this interval is equivalent to a request sent from the POS terminal 13 (client) to the maintenance server 17 (server).

The maintenance server 17 can send data to the POS terminal 13 as the response to receipt of the request data D1 (request).

The log receiver 501 of the maintenance server 17 receives the request data D1 sent by the POS terminal 13.

The log receiver 501 then outputs the received request data D1 to the response unit 502 (arrow Y3 in FIG. 3).

The response unit 502 references the command storage database 511 based on the log data D11 input from the log receiver 501, and generates response data D2 as a response to the request data D1 (request).

As described further below, the response data D2 includes process command control data D21 (control data) causing the POS terminal 13 to execute a specific process, and error warning/prediction report data D22, which indicates if a specific log item (described further below) is in an error warning state (described further below) or an error prediction state (described further below).

The response unit 502 sends the generated response data D2 to the POS terminal 13 (arrow Y5 in FIG. 3).

The response unit 502 also outputs the request data D1 to the log storage unit 503 (arrow Y4 in FIG. 3).

Based on the request data D1 input from the response unit 502, the log storage unit 503 stores a record in the first status information database 513 (described further below) and stores a record in the a second status information database 514 (described further below).

The communication manager 204 of the POS terminal 13 receives the response data D2 sent by the maintenance server 17.

The communication manager 204 outputs the error warning/prediction report data D22 contained in the received response data D2 to the log recorder 203 (arrow Y6 in FIG. 3).

The communication manager 204 also outputs the process command control data D21 contained in the received response data D2 to the command execution unit 205 (arrow Y7 in FIG. 3).

Based on the process command control data D21 input from the communication manager 204, the command execution unit 205 executes a specific process. The command execution unit 205 generates process result data D3 indicating the result of a specific process that was executed. The command execution unit 205 then outputs the generated process result data D3 to the log recorder 203 (arrow Y8 in FIG. 3).

The log recorder 203 changes the content of the generating interval settings file 221 as needed based on the error warning/prediction report data D22 and log data D11 input from the communication manager 204.

The log recorder 203 also generates process result report data D12 based on the process result data D3 input from the command execution unit 205.

The log recorder 203 then references the generating interval settings file 221, and generates and outputs request data D1 at the interval set in the generating interval settings file 221 to the communication manager 204.

As described above, data is exchanged between the POS terminal 13 and maintenance server 17 in a cycle in which the POS terminal 13 sends request data D1 (log data D11) to the maintenance server 17 after an interval, the maintenance server 17 executes a process based on the request data D1 and sends response data D2 as the response, and the POS terminal 13 executes a process based on the received response data D2.

The operation of the maintenance server 17 when managing the status of a POS terminal 13 and printer 14 is described next.

Figure 4:
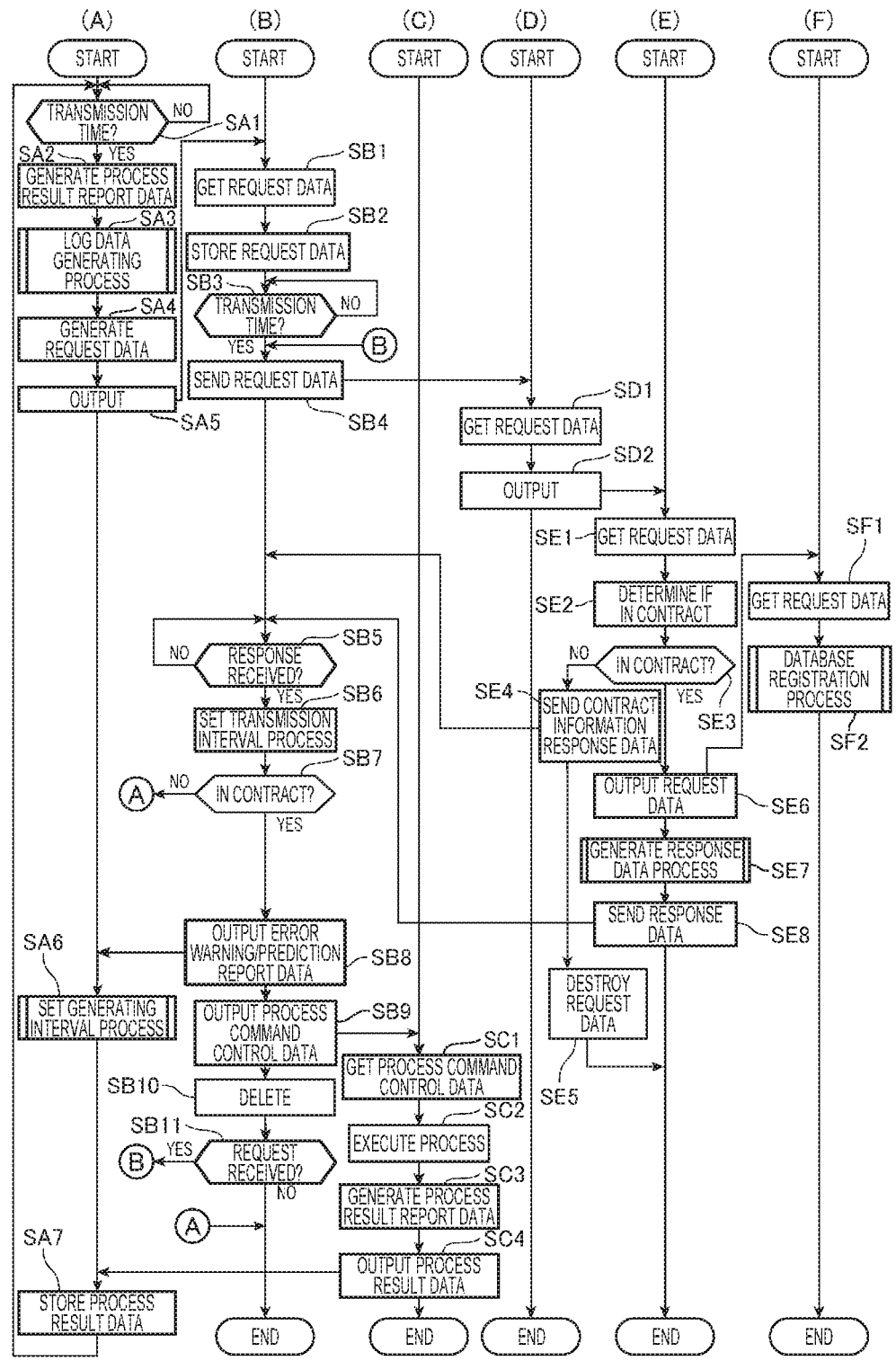
FIG. 4 is a flow chart showing the operation of devices in the network system.

FIG. 4 is a flow chart showing the operation of the POS terminal 13 and maintenance server 17.

Column (A) of FIG. 4 shows the operation of the log recorder 203 of the POS terminal 13, column (B) shows the operation of the communication manager 204 of the POS terminal 13, column (C) shows the operation of the command execution unit 205 of the POS terminal 13, column (D) shows the operation of the log receiver 501 of the maintenance server 17, column (E) shows the operation of the response unit 502 of the maintenance server 17, and column (F) shows the operation of the log storage unit 503 of the maintenance server 17.

As shown in column (A) of FIG. 4, the log recorder 203 references the generating interval settings file 221 and monitors if it is time to generate (or transmitting) request data D1 (step SA1).

The generating interval settings file 221 is a file recording information indicating the interval for generating (or transmitting) the request data D1. In step SA1, the log recorder 203 references the generating interval settings file 221 and determines it is time to generate (or send) the request data D1 if the interval denoted by the generating interval settings file 221 has past since the last time request data D1 was generated (sent).

As described further below, the interval indicated by the information recorded in the generating interval settings file 221 is a predetermined interval (referred to below as the reference generating interval) that is set as the longest interval, and in certain cases may be an interval shorter than the reference generating interval.

If the timing indicated by the request data D1 has been reached (step SA1: YES), the log recorder 203 generates the process result report data D12 based on the process result data D3 stored in the specific storage area (step SA2).

The process result report data D12 is text data in a format enabling writing information in a hierarchical structure (such as XML (eXtensible Markup Language) data), and is data that can be transmitted as a request to the maintenance server 17.

After generating the process result report data D12, the log recorder 203 deletes the process result data D3 used to generate the process result report data D12 from the specific storage area.

As will be understood below, the log recorder 203 stores the process result data D3 input from the command execution unit 205 in a specific storage area by the time it is determined that the time to generate the request data D1 in step SA1 has been reached after the request data D1 was last generated (or transmit).

Next, the log recorder 203 executes a log data generating process (step SA3). The log data generating process is a process that generates the log data D11. The log data generating process is described next.

Figure 5:
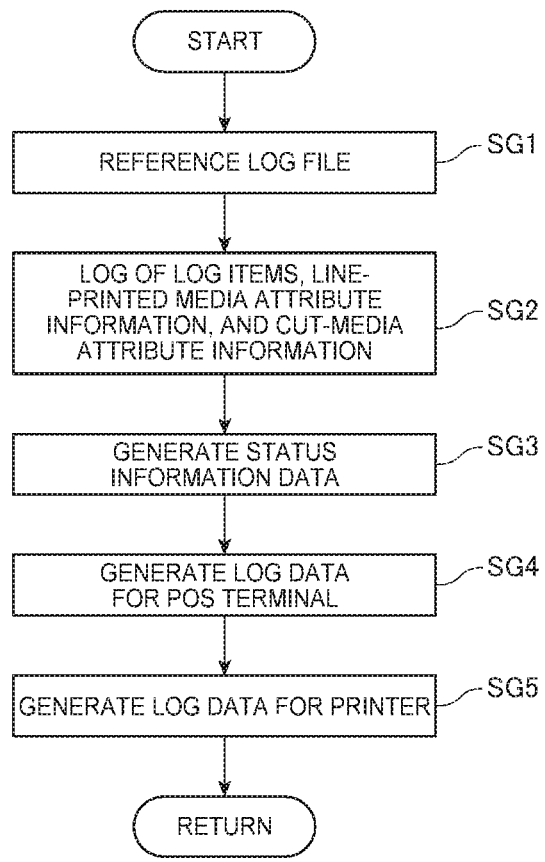
FIG. 5 is a flow chart showing an operation of the POS terminal.

FIG. 5 is a detailed flow chart showing the operation of the log recorder 203 when executing the log data generating process.

As shown in FIG. 5, the log recorder 203 references the log file 223 stored by the control device storage unit 22 (step SG1).

The log file 223 is a file recording a log of multiple log items. A log item is a state to be monitored and recorded. Examples of log items in this embodiment include: communication error, printer error, RAM usage, CPU usage, CPU temperature, data transfer rate, actual SSD usage, the cumulative printhead line count, the cumulative cutter operation count, operating process, and connected device.

Note that these are examples of log items used in this embodiment of the disclosure, and other items may be logged in addition to the foregoing items or instead of one or more of the foregoing items.

Information indicating a communication error occurred, information indicating that a communication error was resolved, and information indicating the time (date and time) are recorded chronologically as a log of communication errors. A communication error refers to a state in which normal communication is not possible, such as an overflow of the receive buffer for temporarily storing received data.

The process controller 201 monitors if a communication error occurred and if the communication error was resolved (log item: monitor communication error status), and a log of communication error log items is recorded in the log file 223.

Information indicating if a printer error occurred, information indicating if a printer error was resolved, and information indicating the date and time are recorded chronologically as a log of printer errors in the log file 223. A printer error occurs when normal printing is not possible, such as when the roll paper runs out or the roll paper jams.

The process controller 201 monitors if a printer error occurred and if the printer error was resolved (log item: monitor printer error status), and a log of printer error log items is recorded in the log file 223.

Information indicating RAM usage and information indicating the time and date are recorded chronologically as a log of RAM usage in the log file 223.

The process controller 201 acquires RAM usage by a specific means at a predetermined interval (log item: monitor state of RAM usage), and records information denoting the acquired RAM usage in the log file 223.

Information denoting CPU usage and information denoting the date and time are recorded chronologically in the log file 223 as a log of CPU usage.

The process controller 201 acquires CPU usage at a predetermined interval (log item: monitor state of CPU usage), and records a log of CPU usage log items in the log file 223.

Information denoting CPU temperature and information denoting the date and time are recorded chronologically in the log file 223 as a log of CPU temperature log items.

The process controller 201 acquires the CPU temperature by a specific means at a predetermined interval (log item: monitor status of CPU temperature), and records a log of CPU temperature log items in the log file 223.

Information indicating the data transfer rate and information indicating the date and time are recorded chronologically in the log file 223 as a log of data transfer rate log items. The data transfer rate is the amount of data that can be transmitted per unit time through the global network GN.

The process controller 201 acquires the data transfer rate by a specific means at a predetermined interval (log item: monitor data transfer rate status), and records a log of data transfer rate items in the log file 223.

The cumulative number of writes to SSD, the average amount of data written per unit time to SSD, or other information indicating values required to calculate SSD life (the value required to calculate SSD life is referred to below as the "actual SSD use") are recorded with information denoting the time and date chronologically as a log of actual SSD use log items in the log file 223.

The process controller 201 acquires the actual SSD use at a predetermined interval (log item: monitor state of actual use) and records a log of actual SSD use log items in the log file 223.

Information denoting the cumulative total number of lines printed by the printhead, and information denoting the time and date, are chronologically recorded in the log file 223 as a log of total printed line count log items.

The cumulative printhead line count is the total number of lines printed by the printhead 211. As described above, the control device print unit 21 of the POS terminal 13 in this embodiment of the disclosure prints images by repeatedly alternating between forming one line of dots with the printhead 211, and conveying the roll paper one line by the conveyance mechanism. As also described above, printing a line means forming one line of dots with the printhead 211.

The process controller 201 acquires the total number of lines printed by the printhead during a specific time (log item: monitoring cumulative printhead line count), and records a log of total printed line count log items in the log file 223.

Information denoting the cumulative total number of times the cutter is used, and information denoting the time and date, are chronologically recorded in the log file 223 as a log of cumulative cutter operation count log items.

The cumulative cutter operation count is the total number of times the cutter 212 cuts the roll paper.

The process controller 201 acquires the cumulative cutter operation count at a predetermined interval (log item: monitoring the cumulative cutter operation count) and records a log of cumulative cutter operation count log items in the log file 223.

A string representing the name of the process of the current operating state (a state in which CPU time is allocated), and information indicating the date and time, are recorded chronologically in the log file 223 as a log of operating process items.

The process controller 201 acquires the process of the operating state at a predetermined interval, and records a log of operating process log items in the log file 223.

A string representing the type of a connected device, and information indicating the date and time, are recorded chronologically in the log file 223 as a log of connected device items.

A connected device is a device that is connected either by wire or wirelessly, and means a device that can communicate normally.

The process controller 201 acquires the type of connected devices at a predetermined interval, and records a log of connected device items in the log file 223.

Note that in addition to the log items recorded in the log file 223 described above, at least line-printed media attribute information, and cut-media attribute information, are recorded in the log file 223.

The line-printed media attribute information includes a value relating information denoting a combination of quality, type, and thickness attributes of the roll paper recording media previously stored in the POS terminal 13 (referred to below as recording media attributes), and information denoting the total number of lines printed on roll paper having each media attribute.

In one example, roll paper of recording media attributes $z1$ related to a combination of paper quality $kx1$, type $sx1$, and thickness $ax1$, and roll paper of recording media attributes $z2$ related to a combination of paper quality $kx2$, type $sx2$, and thickness $ax2$, were previously stored (used) in the POS terminal 13. The cumulative printhead line count is 100; the total number of lines printed on roll paper of recording media attributes $z1$ is 30; and the total number of lines printed on roll paper of recording media attributes $z2$ is 70. In this example, the line-printed media attribute information is information relating the information denoting recording media attributes $z1$ with information denoting the total number of lines printed on roll paper of recording media attributes $z1$ is 30; and information relating the information denoting recording media attributes z2 with information denoting the total number of lines printed on roll paper of recording media attributes z2 is 70.

The cut-media attribute information is a value relating information indicating the attributes of the roll paper recording media previously stored in the POS terminal 13, and information indicating the total number of times roll paper with those attributes was cut by the cutter 212.

In one example, roll paper of recording media attributes z1, and roll paper of recording media attributes z2, were previously stored in the POS terminal 13. The total number of cuts made by the cutter is 100, including a total of 30 cuts made by the cutter 212 in roll paper of recording media attributes z1, and a total of 70 cuts made by the cutter 212 in roll paper of recording media attributes z2. In this example, the cut-media attribute information is information relating information denoting recording media attributes z1 to information identifying 30 as the total number of cuts made in roll paper of recording media attributes z1, and information relating information denoting recording media attributes z2 to information identifying 70 as the total number of cuts made in roll paper of recording media attributes z2.

The process controller 201 manages the recording media attributes of the roll paper stored in the POS terminal 13 based on input from specific sensors and input from the user by a specific means, and records the line-printed media attribute information and cut-media attribute information to the log file 223 as appropriate.

As shown in FIG. 5, the log recorder 203 acquires the log of log items, the line-printed media attribute information, and the cut-media attribute information, based on the log file 223 referenced in step SG1 (step SG2).

Next, the log recorder 203 generates status information data (status information) for the log items (step SG3). The status information data of the log items is described further below.

FIGS. 6A-6K illustrate the content of the status information data for each log item.

As described further below, the status information data includes status identification information, which is information identifying particular status information data.

FIG. 6A shows the content of status information data for communication error log items (referred to below as communication error status information data).

As shown in FIG. 6A, the communication error status information data includes status identification information identifying the communication error status information data (referred to below as communication error status identification information).

The communication error status information data includes communication error state information. Communication error state information includes information indicating the communication error of the current state (the time corresponding to when the request data D1 is generated (or transmit)), and information indicating the date and time the communication error occurred.

In step SG3, the log recorder 203 generates communication error state information based on the log of communication error log items, and generates communication error status information data relating the communication error status identification information with the communication error state information.

Note that if a communication error has not occurred at the current time (that is, any previous communication error has been resolved and a new communication error has not occurred), the log recorder 203 does not generate communication error status information data.

FIG. 6B shows the content of status information data for printer error log items (referred to below as printer error status information data).

As shown in FIG. 6B, the printer error status information data includes status identification information identifying the printer error status information data (referred to below as printer error status identification information).

The printer error status information data includes printer error state information. Printer error state information includes information indicating the printer error of the current state (the time corresponding to when the request data D1 is generated (or transmit)), and information indicating the date and time the printer error occurred.

In step SG3, the log recorder 203 generates printer error state information based on the log of printer error log items, and generates printer error status information data relating the printer error status identification information with the printer error state information.

Note that if a printer error has not occurred at the current time (that is, any previous printer error has been resolved and a new printer error has not occurred), the log recorder 203 does not generate printer error status information data.

FIG. 6C shows the content of status information data for RAM usage log items (referred to below as RAM usage status information data).

As shown in FIG. 6C, the RAM usage status information data includes status identification information identifying the RAM usage status information data (referred to below as RAM usage status identification information).

The RAM usage status information data includes RAM usage state information. RAM usage state information includes information indicating current RAM usage (RAM usage when the request data D1 is generated), and information indicating the date and time RAM usage was measured.

In step SG3, the log recorder 203 generates RAM usage state information based on the log of RAM usage log items, and generates RAM usage status information data relating the RAM usage status identification information with the RAM usage state information.

FIG. 6D shows the content of status information data for CPU usage log items (referred to below as CPU usage status information data).

As shown in FIG. 6D, the CPU usage status information data includes status identification information identifying the CPU usage status information data (referred to below as CPU usage status identification information).

The CPU usage status information data includes CPU usage state information. CPU usage state information includes information indicating current CPU usage (CPU usage when the request data D1 is generated), and information indicating the date and time CPU usage was measured.

In step SG3, the log recorder 203 generates CPU usage state information based on the log of CPU usage log items, and generates CPU usage status information data relating the CPU usage status identification information with the CPU usage state information.

FIG. 6E shows the content of status information data for CPU temperature log items (referred to below as CPU temperature status information data).

As shown in FIG. 6E, the CPU temperature status information data includes status identification information identifying the CPU temperature status information data (referred to below as CPU temperature status identification information).

The CPU temperature status information data includes CPU temperature state information. CPU temperature state information includes information indicating the current CPU temperature (CPU temperature when the request data D1 is generated), and information indicating the date and time the CPU temperature was measured.

In step SG3, the log recorder 203 generates CPU temperature state information based on the log of CPU temperature log items, and generates CPU temperature status information data relating the CPU temperature status identification information with the CPU temperature state information.

FIG. 6F shows the content of status information data for data transfer rate log items (referred to below as data transfer rate status information data).

As shown in FIG. 6F, the data transfer rate status information data includes status identification information identifying the data transfer rate status information data (referred to below as data transfer rate status identification information).

The data transfer rate status information data includes data transfer rate state information. data transfer rate state information includes information indicating the current data transfer rate (data transfer rate when the request data D1 is generated), and information indicating the date and time the data transfer rate was measured.

In step SG3, the log recorder 203 generates data transfer rate state information based on the log of data transfer rate log items, and generates data transfer rate status information data relating the data transfer rate status identification information with the data transfer rate state information.

FIG. 6G shows the content of status information data for actual SSD use log items (referred to below as actual SSD use status information data).

As shown in FIG. 6G, the actual SSD use status information data includes status identification information identifying the actual SSD use status information data (referred to below as actual SSD use status identification information).

The actual SSD use status information data includes actual SSD use state information and SSD life information.

The actual SSD use status information data includes actual SSD use state information. Actual SSD use state information (such as the cumulative total of SSD write operations) includes information indicating the current actual SSD use (when the request data D1 is generated), and information indicating the date and time actual SSD use was measured.

In step SG3, the log recorder 203 generates actual SSD use state information based on the log of actual SSD use log items.

SSD life information is information indicating SSD life.

In step SG3, the log recorder 203 calculates the life of the SSD device by a specific method, and generates SSD life information.

In step SG3, the log recorder 203 generates actual SSD use status information data relating the actual SSD use status identification information with the actual SSD use state information and SSD life information.

FIG. 6H shows the content of status information data for the cumulative printhead line count log items (referred to below as cumulative printhead line count status information data).

As shown in FIG. 6H, the cumulative printhead line count status information data includes status identification information identifying the cumulative printhead line count status information data (referred to below as cumulative printhead line count status identification information).

The cumulative printhead line count status information data includes cumulative printhead line count state information and remaining usable printhead days information.

The cumulative printhead line count state information includes information indicating the current cumulative printhead line count (when the request data D1 is generated), and information indicating the date and time the cumulative printhead line count was acquired.

In step SG3, the log recorder 203 generates cumulative printhead line count state information based on the log of cumulative printhead line count log items.

The remaining usable printhead days information is information indicating the remaining number of days that the printhead 211 can be used (referred to below as the "remaining usable printhead day count").

In step SG3 the log recorder 203 calculates the remaining usable printhead day count using equation (1) below.

$$IH = (IUseLimit - IUse(N)) \div [(IUse(N) - IUse(0)) \div N] \quad (1)$$

In equation (1), IH represents the remaining usable printhead day count.

Iuselimit represents the maximum number (upper limit) of lines that can be printed (formed) by the printhead 211 (the upper limit of the printhead 211 usage count).

IUse (N) represents the cumulative total number of lines formed by the printhead 211 from day 1 to day N, where day 1 is the first day the POS terminal 13 was installed and used.

IUse (0) represents the cumulative total number of lines formed by the printhead 211 before the POS terminal 13 was installed in the store. This is because content may have been printed for testing or other purposes before the POS terminal 13 was installed for use.

The (IUseLimit-IUse (N)) portion on the right side of equation (1) represents the remaining number of lines that can be formed by the 211.

The [(IUse (N)−IUse (0))±N] portion on the right side of equation (1) represents the average number of lines printed by the printhead 211 each day since the POS terminal 13 was installed in the store.

By dividing the remaining number of lines that can be printed by the printhead 211 by the average number of lines the POS terminal 13 prints each day, the remaining usable printhead day count assuming the POS terminal 13 continues being used in the same way can be calculated.

To calculate the remaining usable printhead day count using equation (1), the log recorder 203 calculates N, IUse (N), and IUse (0) based on the log file 223. The values of these variables (or values required to calculate these variables) are recorded by the process controller 201 in the log file 223.

The log recorder 203 calculates the value of IUseLimit based on the line-printed media attribute information recorded in the log file 223 as described below.

More specifically, the log recorder 203 calculates IUseLimit by multiplying a previously set IUseLimit default value by coefficients set for each of the recording media attributes of roll paper that has previously been used in the POS terminal 13. Note that to calculate IUseLimit, the log recorder 203 weights the coefficients of the recording media attributes according to the cumulative total number of lines formed on roll paper of those recording media attributes.

In this example, the recording media attribute is information denoting a combination of roll paper quality, type, and thickness values. Deterioration (wear) when lines are formed by the printhead 211 differs according to the combination of roll paper quality, type, and thickness values. Based thereon, the coefficient that is set for a particular combination of recording media attributes is set based on the results of prior tests or simulations so that the coefficient increases as the degree of deterioration of the printhead 211 increases when forming lines on roll paper of a particular set of recording media attributes, and decreases as the degree of deterioration of the printhead 211 decreases.

By calculating the remaining usable printhead day count of the printhead 211 by equation (1) using the IUseLimit value calculated as described above, the remaining usable printhead day count can be appropriately calculated to reflect the variable degree of deterioration of the printhead 211 when printing lines due to differences in the quality, type, and thickness of the roll paper.

Note that this effect can be achieved in this embodiment of the disclosure by calculating the remaining usable printhead day count to reflect the quality, type, and thickness of the roll paper (recording medium) previously used, or to reflect at least one of the quality, type, and thickness of the roll paper. This also applies to the remaining usable cutter days described further below.

In step SG3, the log recorder 203 calculates the remaining usable printhead days information by the above method based on the line-printed media attribute information, and generates the remaining usable printhead days information denoting the calculated remaining usable printhead day count.

In step SG3, the log recorder 203 relates the cumulative printhead line count status identification information, cumulative printhead line count state information, and remaining usable printhead days information, and generates the cumulative printhead line count status information data.

FIG. 6I shows the content of status information data for the cumulative cutter operation count log items (referred to below as cumulative cutter operation count status information data).

As shown in FIG. 6I, the cumulative cutter operation count status information data includes status identification information identifying the cumulative cutter operation count status information data (referred to below as cumulative cutter operation count status identification information).

The cumulative cutter operation count status information data includes cumulative cutter operation count state information and remaining usable cutter days information.

The cumulative cutter operation count state information includes information indicating the current cumulative cutter operation count (when the request data D1 is generated), and information indicating the date and time the cumulative cutter operation count was acquired.

In step SG3, the log recorder 203 generates cumulative cutter operation count state information based on the log of cumulative cutter operation count log items.

The remaining usable cutter days information is information indicating the remaining number of days that the cutter 212 can be used (referred to below as the remaining usable cutter days).

In step SG3, the log recorder 203 calculates the remaining usable cutter days using equation (2) below.

$$KH = (KUseLimit - KUse(N)) \div [(KUse(N) - KUse(0)) \div N] \quad (2)$$

In equation (2), KH represents the remaining usable cutter days.

KUseLimit represents the maximum number of usable days for the cutter 212.

KUse (N) represents the cumulative total number of days the cutter 212 was used from day 1 to day N, where day 1 is the first day the POS terminal 13 was installed and used.

IUse (0) represents the total number of days the cutter 212 has been used since the POS terminal 13 was installed in the store.

The (KUseLimit-KUse (N)) portion on the right side of equation (2) denotes the remaining number of times the cutter 212 can be used.

The [(KUse (N)−KUse (0))÷N] portion on the right side of equation (2) denotes the average number of times the cutter 212 was used in one day since the POS terminal 13 was installed in the store.

By dividing the remaining number of times the cutter 212 can be used by the average number of times the cutter 212 is used in one day, the remaining usable cutter days assuming the POS terminal 13 continues being used in the same way in the store can be calculated.

To calculate the remaining usable cutter days using equation (2), the 203 calculates the values of N, KUse (N), and KUse (0) based on the log file 223. The values of these variables (or values required to calculate these variables) are recorded by the process controller 201 in the log file 223.

The log recorder 203 calculates the value of KUseLimit based on the cut-media attribute information recorded in the log file 223 as described below.

More specifically, the log recorder 203 calculates KUseLimit by multiplying a previously set KUseLimit default value by coefficients set for each of the recording media attributes of roll paper that has previously been used in the POS terminal 13. Note that, to calculate KUseLimit, the log recorder 203 weights the coefficients of the recording media attributes according to the cumulative total number of times roll paper of those recording media attributes was cut.

In this example, the recording media attribute is information denoting a combination of roll paper quality, type, and thickness values. Deterioration (wear) of the cutter 212 from cutting roll paper differs according to the combination of roll paper quality, type, and thickness values. Based thereon, the coefficient that is set for a particular combination of recording media attributes is set based on the results of prior tests or simulations so that the coefficient increases as the degree of deterioration of the cutter 212 increases when cutting roll paper of a particular set of recording media attributes, and decreases as the degree of deterioration of the cutter 212 decreases.

By calculating the remaining usable cutter days by equation (2) using the KUseLimit value calculated as described above, the remaining usable cutter days can be appropriately calculated to reflect the variable degree of deterioration of the cutter 212 when cutting roll paper due to differences in the quality, type, and thickness of the roll paper.

In step SG3, the log recorder 203 calculates the remaining usable cutter days information by the above method based on the cut-media attribute information, and generates the remaining usable cutter days information denoting the calculated remaining usable cutter days.

In step SG3, the log recorder 203 relates cumulative cutter operation count status identification information, the cumulative cutter operation count state information, and the remaining usable cutter days information to generate the cumulative cutter operation count status information data.

FIG. 6J shows the content of status information data for the operating process log items (referred to below as operating process status information data).

As shown in FIG. 6J, the operating process status information data includes status identification information identifying the operating process status information data (referred to below as operating process status identification information).

The operating process state information includes information (a string identifying the process) indicating the process that is currently executing (operating; the process to which CPU time is allocated) (when the request data D1 is generated), and information indicating the date and time the operating process was acquired.

In step SG3, the log recorder 203 generates operating process state information based on the log of operating process log items, and relates the operating process status identification information and operating process state information to generate the operating process status information data.

FIG. 6K shows the content of status information data for the connected device log items (referred to below as connected device status information data).

As shown in FIG. 6K, the connected device status information data includes status identification information identifying the connected device status information data (referred to below as connected device status identification information).

The connected device status information data includes connected device state information.

The connected device state information includes information indicating the type of device currently connected (when the request data D1 is generated), and information indicating the date and time the connected device state information was acquired.

In step SG3, the log recorder 203 generates connected device state information based on the log of connected device log items, relates the connected device status identification information and the connected device state information, and generates the connected device status information data.

After generating status information data for each log item in step SG3, the log recorder 203 generates log data D11 including status information data for each log item and the POS terminal ID of the POS terminal 13 (step SG4).

The POS terminal ID is information identifying the POS terminal 13, and may be the serial number assigned to the POS terminal 13 when the POS terminal 13 was manufactured, for example.

The log data D11 is text data in a format enabling writing information in a hierarchical structure (such as XML (eXtensible Markup Language) data), and the information is written using a hierarchical key and value combination.

Next, the log recorder 203 communicates with each printer 14 associated with the same POS unit 16, and generates log data D11 for each printer 14 (step SG5). Below, the log data D11 for POS terminal 13 is referred to as main log data D11$m$, and the log data D11 for the printer 14 is referred to as sub log data D11$s$ to differentiate therebetween.

Like the main log data D11$m$, the sub log data D11$s$ is data including status information data for each log item of a printer 14, and printer identification information for the printer 14.

Printer identification information (referred to below as the "printer ID") is information identifying a specific printer 14, and in this example is the serial number uniquely assigned to each printer 14 when the printer 14 is manufactured.

In step SG5, the log recorder 203 communicates with each of the other printers 14 connected to the same POS unit 16, and acquires from each of the printers 14 the information required to generate a log of the printer 14 log items and other sub log data D11$s$. The information required to communicate with the printer 14, such as the IP address of the printer 14, the protocol used for communication with the printer 14, and the formats of data exchanged with the printer 14, is previously registered.

Next, the log recorder 203 generates status information data for each log item of each printer 14 based on the log of each log item, and generates sub log data D11$s$ based on the generated status information data.

After generating the main log data D11$m$ and sub log data D11$s$, the log recorder 203 ends the log data generating process of step SA3.

As shown in column (A) of FIG. 4, after generating the log data D11 (main log data D11$m$ and sub log data D11$s$) generated in the log data generating process of step SA3, the log recorder 203 generates request data D1 (step SA4).

The request data D1 is text data of information written in a hierarchical structure and including a store ID identifying the store where the POS terminal 13 is installed, the POS terminal ID of the POS terminal 13, the process result report data D12, main log data D11$m$, and sub log data D11$s$ (if there are plural printers 14 associated with the same POS unit 16 as the POS terminal 13, sub log data D11$s$ for each printer 14).

FIG. 7 shows an example of the request data D1 in a format convenient for description.

In the example of request data D1 shown in FIG. 7, the store ID and POS terminal ID are written in block A1.

The process result report data D12 is written to block A2.

The main log data D11$m$ is written to block A3. The POS terminal ID is written to block A31 of block A3. Status information data is written to block A32 of block A3. Status identification information is written to block A321 of block A32.

The sub log data D11$s$ is written to block A4. The printer ID is written to block A41 of block A4. Status information data is written to block A42 of block A4. Status identification information is written to block A421 of block A42.

As shown in column (A) of FIG. 4, after generating the request data D1 in step SA4, the log recorder 203 outputs the generated request data D1 by interprocess communication to the communication manager 204 (step SA5).

As shown in column (B) of FIG. 4, the communication manager 204 acquires the request data D1 input from the log recorder 203 (step SB1).

Next, the communication manager 204 stores the acquired request data D1 in a specific storage area (step SB2). Request data D1 that has not been sent to the maintenance server 17, and request data D1 that has been deleted from the maintenance server 17 for reasons as described below after being sent to the maintenance server 17, are cumulatively stored in the specific storage area.

Next, the communication manager 204 references the transmission interval settings file 222 and monitors if it is time to send the request data D1 to the maintenance server 17 (step SB3).

The transmission interval settings file 222 is a file recording information indicating the timing for transmitting request data D1.

The request data D1 may be sent at two different times as described below.

The first timing is when the request data D1 is generated by the log recorder 203. In this case, the timing for generating the request data D1 and the timing for transmitting the request data D1 are synchronized, and the generated request data D1 is sent to the maintenance server 17 synchronized to generating the request data D1. This first timing is referred to below as the normal transmission time.

The second timing is when a predetermined interval (referred to below as the "no-contract interval") has past since the last time request data D1 was transmitted. This no-contract interval is a period longer than the reference generating interval (the longest interval for generating request data D1) described above. For example, if the reference generating interval is 5 minutes, the predetermined interval for transmitting the request data D1 is one hour. This second timing is referred to below as the "no-contract transmission time").

As described further below, when the contract with the company using the store system 11 in which the POS terminal 13 is deployed ends, information indicating the no-contract transmission time is recorded in the transmission interval settings file 222.

If the time recorded in the transmission interval settings file 222 is the normal transmission time, the communication manager 204 determines in step SB3 that the timing for transmitting the request data D1 to the maintenance server 17 has been reached when input of the log data D11 from the log recorder 203 is completed.

If the time recorded in the transmission interval settings file 222 is the no-contract transmission time, the communication manager 204 determines in step SB3 that the timing for transmitting the request data D1 has been reached when the no-contract interval has past since the last time request data D1 was transmitted.

If the timing for transmitting request data D1 has come (step SB3: YES), the communication manager 204 controls the control device communication unit 23 to send the request data D1 stored in the specific storage area as a request to the maintenance server 17 (step SB4). For example, the communication manager 204 may send an HTTP (Hypertext Transfer Protocol) request having the request data D1 written in the request body to the maintenance server 17 by HTTP. Note that the information required to send the request data D1 as a request to the maintenance server 17, including the URL of the maintenance server 17 to which to send the request data D1 and the protocol to use, are pre-registered.

Note that if plural request data D1 are stored in the specific storage area, the communication manager 204 sends the request data D1 stored with the oldest time in the specific storage area.

After transmitting the request data in step SB4, the communication manager 204 monitors for a response (contract information response data or response data D2) from the maintenance server 17 (step SB5).

As shown in column (D) of FIG. 4, the log receiver 501 of the maintenance server 17 controls the maintenance server communication unit 52 to receive and acquire the request data D1 sent by the communication manager 204 (step SD1).

Next, the log receiver 501 outputs the acquired request data D1 to the response unit 502 (step SD2).

As shown in column (E) of FIG. 4, the response unit 502 acquires the request data D1 input from the log receiver 501 (step SE1).

Next, the response unit 502 references the contract management database 512 (contract period information) and determines if the current time is within the contract period of the corresponding company (step SE2).

The contract management database 512 is a database storing records relating, for each store that may be managed by the maintenance server 17, the store ID and contract period of the company using the store system. 11 of that store. The contract period of a company is the period during which the company can manage the store system 11 using the maintenance server 17. The contract period of a store is previously determined by a contract between the company operating the maintenance server 17 and the company managing the store. The company operating the maintenance server 17 uses the maintenance server 17 to manage the POS terminals 13 and printers 14 in store systems 11 of the contracting corporation during the contract period, and receives income as compensation.

The content of the contract management database 512 may be appropriately rewritten according to the content of the contract with the contracting company, and corresponds to the actual conditions of the contract.

In step SE2, the response unit 502 acquires the store ID of the store where the POS terminal 13 that transmitted the request data D1 is located. As described above, the store ID is written in the request data D1. Next, the response unit 502 retrieves the record with the acquired store ID from the records in the contract management database 512. Next, the response unit 502 acquires the information identifying the contract period from the retrieved record, and determines if the current time is within the contract period.

Next, the response unit 502 determines if the current time is within the contract period of the company (step SE3).

If the present time is not within the contract period (step SE3: NO), the response unit 502 generates contract information response data, and controls the maintenance server communication unit 52 to send the generated contract information response data as the response (step SE4).

More specifically, the response unit 502 generates contract information response data including information indicating the contract has expired (the present time is not within the contract period) as the response.

Next, the response unit 502 deletes the request data D1 (step SE5), and ends the process. In this event, records based on the request data D1 (information based on the log data D11) are not stored in the first status information database 513 and the second status information database 514. This is because these processes are processes that are only executed for companies under contract, that is, companies that have paid for the service.

If the company is currently under contract (step SE3: YES), the response unit 502 outputs the request data D1 acquired in step SE1 to the log storage unit 503 (step SE6). Processing by the log storage unit 503 is described further below.

Next, the response unit 502 executes the response data generating process (step SE7).

The response data generating process is a process for generating response data D2. The response data generating process is described further below.

FIG. 8A is a flow chart showing the operation of the response unit 502 when executing the response data generating process.

As shown in FIG. 8A, in the response data generating process, the response unit 502 executes a process command control data generating process (step SH1) to generate process command control data D21.

FIG. 8B is a flow chart of the operation of the response unit 502 when executing the process command control data generating process.

As shown in FIG. 8B, in the process command control data generating process, the response unit 502 references the command storage database 511 (step SI1).

The command storage database 511 is a database of records relating the POS terminal ID of the POS terminal 13 to information about the processes the POS terminal 13 is controlled to execute (referred to below as "executable process information").

The executable process information includes information identifying processes the POS terminal 13 executes, data required to execute those processes, and other information for generating process command control data D21.

The response unit 502 has functions for providing a user interface to an administrator or maintenance technician of the company enabling inputting the POS terminal ID of a specific POS terminal 13 and information required to generate executable process information related to the processes that POS terminal 13 executes, and storing a record in the command storage database 511 based on the input to the user interface. An example of a process the POS terminal 13 is controlled to execute is updating the firmware, and the information required to generate the executable process information when the process to execute is updating the firmware is the program data of the firmware, for example.

More specifically, the corporate administrator that wants to have a specific POS terminal 13 execute a specific process starts a web browser on a terminal to which the web browser is installed, and operates the web browser to access a specific URL on the maintenance server 17. After performing the required authentication when the specific URL is accessed, the response unit 502 causes the terminal to display a user interface (web page) enabling inputting the POS terminal ID and information required to generate the executable process information. The corporate administrator then inputs the POS terminal ID of the specific POS terminal 13, and the information required to generate process-execution information related to the process the specified POS terminal 13 is to execute. The response unit 502 acquires the information required to generate the process-execution information input to the user interface, and based on the acquired information generates the executable process information. The response unit 502 then accesses the command storage database 511, and stores in the database a record relating the POS terminal ID input to the user interface and the executable process information that was generated.

After referencing the command storage database 511 in step SI1, the response unit 502 acquires the POS terminal ID of the POS terminal 13 that sent the request data D1 (step SI2). As described above, the POS terminal ID is written in the request data D1.

Next, the response unit 502 determines if a record holding the POS terminal ID acquired in step SI2 is in the command storage database 511 (step SI3).

If a record holding the POS terminal ID acquired in step SI2 is not in the command storage database 511 (step S13: NO), the response unit 502 goes to step SI5.

If a record holding the POS terminal ID acquired in step SI2 is in the command storage database 511 (step SI3: YES), the response unit 502 acquires the executable process information from the record (if there are plural records with the POS terminal ID, the executable process information from each record) identified by the POS terminal ID acquired in step SI2 (step SI4). Note that if between when response data D2 was last transmitted and the present, a user (including the corporate administrator) stored a record in the command storage database 511 by the means described above to cause the POS terminal 13 that sent the request data D1 to execute a specific process, a record with the POS terminal ID acquired in step SI2 will be in the command storage database 511.

In the next step SI5, the response unit 502 acquires the process result report data D12 contained in the request data D1 (step SI5).

Next, the response unit 502 generates the process command control data D21 based on the executable process information acquired in step SI4 and the process result report data D12 acquired in step SI5 (step SI6).

More specifically, the response unit 502 generates control data (referred to below as first control data) based on the acquired executable process information that causes the POS terminal 13 to execute the process corresponding to the executable process information. If plural records of executable process information are acquired, the response unit 502 generates control data causing the POS terminal 13 to execute the processes corresponding to the executable process information from the plural records. The response unit 502 has a function for generating process command control data D21 causing the POS terminal 13 to execute the corresponding one or plural processes based on the one or more records of executable process information.

Based on the process result report data D12, if there is a process the POS terminal 13 should be controlled to execute based on the result of the process the command execution unit 205 executed, the response unit 502 generates control data (referred to below as second control data) for executing that process.

Next, the response unit 502 generates process command control data D21 including the first control data and the second control data. The process command control data D21 is data that can be sent to the POS terminal 13 as a response in JSON (JavaScript® Object Notation) or XML format.

After generating the process command control data D21, the response unit 502 deletes the record with the POS terminal ID acquired in step SI2 from the command storage database 511 (step SI7). As a result of step SI7, the command storage database 511 no longer contains the record used to generate the process command control data D21.

After deleting the record, the response unit 502 ends the process command control data generating process.

Note that the process command control data D21 is not generated if a corresponding record is not in the command storage database 511 and process result report data D12 is not in the request data D1, or if there is not a process to be executed by the POS terminal 13 based on the process result report data D12 contained in the request data D1. However, for ease of description below, the response unit 502 and main processes thereof are described below assuming that process command control data D21 was generated.

As shown in FIG. 8A, after executing the process command control data generating process in step SH1 and generating the process command control data D21, the response unit 502 executes an error warning/prediction report data generating process and generates the error warning/prediction report data D22 (step SH2).

FIG. 8C is a flow chart showing the operation of the response unit 502 when executing the error warning/prediction report data generating process.

As shown in FIG. 8C, in the error warning/prediction report data generating process, the response unit 502 acquires the log data D11 (main log data D11m and sub log data D11s) contained in the request data D1 (step SJ1).

Next, based on the log data D11 acquired in step SJ1, the response unit 502 determines if a specific log item of the POS terminal 13 indicates an error warning state or an error prediction state, and if a specific log item of the printer 14 indicates an error warning state or an error prediction state (step SJ2).

Log items that are determined to be in an error warning state or an error prediction state are the following log items: RAM usage, CPU usage, CPU temperature, and data transfer rate.

The response unit 502 determines by the method described below if the RAM usage log item of the POS terminal 13 is in an error warning state or an error prediction state. Conditions for determining if the RAM usage log item is in an error state (a state in which a RAM error has occurred), an error warning state (a state in which a RAM error has not occurred, but the probability of an error occurring is high if action is not taken), or an error prediction state (a state in which a RAM error has not occurred but may occur if use continues), are previously determined. The conditions are whether or not RAM usage (numeric) and a specific threshold are in a specific relationship. The condition for identifying an error state is, for example, that RAM usage exceeds a specific threshold. The condition for identifying an error warning state is, for example, that RAM usage exceeds a specific threshold that is lower than the threshold for identifying an error state. The condition for identifying an error prediction state is, for example, whether or not the increase or decrease in RAM usage exceeds a specific threshold. Exceeding a specific threshold includes, for example, RAM usage momentarily exceeding the threshold, and RAM usage exceeding the threshold continuing for a specific time.

To determine if the RAM usage log item is in an error warning state or an error prediction state, the response unit 502 acquires the RAM usage state information of the RAM usage status information data contained in the main log data D11*m* of the request data D1. As described above, the RAM usage state information includes information indicating the change in RAM usage during a specific period chronologically. Next, the response unit 502 determines if the RAM usage log item indicates an error warning state or an error prediction state by determining if the condition related to the error warning state or an error prediction state is met.

The conditions for identifying an error warning state and an error prediction state can be changed by the maintenance technician or corporate administrator using a specific means.

The response unit 502 uses the same method to determine if the CPU usage, CPU temperature, and data transfer rate log items indicate an error warning state or an error prediction state.

The response unit 502 also uses the same method to determine based on the sub log data D11*s* if specific log items of the printer 14 indicate an error warning state or an error prediction state.

Note that when (date and time) a specific log item reached a specific state, and the chronological relation to the current date and time are also considered when determining if a log item is in an error warning state or an error prediction state.

An error warning state and an error prediction state are states in which the possibility of an error occurring is high.

In step SJ3, the response unit 502 generates error warning/prediction report data D22 based on the result of step SJ2.

More specifically, if a specific log item of the POS terminal 13 is in an error warning state or an error prediction state, or if a specific log item of the printer 14 is in an error warning state or an error prediction state, for each log item in an error warning state or an error prediction state, the response unit 502 generates error warning/prediction report data D22 including information identifying the log item and information indicating either the error warning state or error prediction state.

If no log item is in an error warning state or error prediction state, the response unit 502 generates error warning/prediction report data D22 containing information indicating no log item is in an error warning state or error prediction state.

The error warning/prediction report data D22 is text data in a format enabling writing information in a hierarchical structure (such as XML (eXtensible Markup Language) data), and is data that can be transmitted as a response to the POS terminal 13.

As shown in FIG. 8A, after executing the error warning/prediction report data generating process, the response unit 502 generates response data D2 based on information indicating the present time is within the contract period of the company based on the result of step SE2, the process command control data D21 generated in step SH1, and the error warning/prediction report data D22 generated in step SH2 (step SH3), and ends the response data generating process.

The response data D2 is data including information indicating the present time is within the contract period of the company, the process command control data D21, and the error warning/prediction report data D22.

As shown in column (E) of FIG. 4, after executing the response data generating process in step SE7, the response unit 502 controls the maintenance server communication unit 52 to send the generated response data D2 as a response to the POS terminal 13 (step SE8). For example, the response unit 502 may send an HTTP response having the response data D2 written in the response body to the POS terminal 13 by HTTP.

After transmitting the response data D2, the response unit 502 ends the process.

As described above, the POS terminal 13 in this embodiment of the disclosure generates log data D11 at a predetermined interval, and sends request data D1 containing the log data D11 to the maintenance server 17. The maintenance server 17 sends response data D2 in response to the request data D1. Thus comprised, the POS terminal 13 can report the status of POS terminal 13 and printer 14 log items to the maintenance server 17 at a predetermined interval. The maintenance server 17 can also use the configuration of the POS terminal 13 transmitting request data D1 including log data D11 at a predetermined interval to send the response data D2 as a response and cause the POS terminal 13 to execute a required process.

As shown in column (B) of FIG. 4, if while waiting to receive a response (contract information response data or response data D2) in step SB5 the communication manager 204 receives a response (step SB5: YES), the communication manager 204 executes a set transmission interval process (step SB6).

More specifically, the communication manager 204 determines based on the contract information response data or response data D2 if the current time is within the contract period. If the current time is within the contract period, the communication manager 204 records information indicating the normal transmission time in the transmission interval settings file 222. If the current time is not within the contract period, the communication manager 204 writes information indicating the no-contract transmission time in the transmission interval settings file 222. The no-contract transmission time is the time when the no-contract interval has past after request data D1 was last transmitted. The no-contract interval is an interval longer than the reference generating interval (the longest interval for generating request data D1).

For example, if the reference generating interval is 5 minutes, the no-contract interval is one hour.

If the result received in step SB5 is that the current time is within the contract period, request data D1 is transmitted at an interval synchronized with the interval at which the request data D1 is generated; if the current time is not within the contract period, the request data D1 is transmitted at the no-contract interval.

In this embodiment of the disclosure, therefore, the interval for transmitting the request data D1 (log data D11) is longer for a company that is presently out of contract than for a company that is still under contract. The effect of this is described below.

When the POS terminal 13 sends request data D1, that much communication bandwidth is consumed, and the maintenance server 17 that receives the request data D1 stores necessary data using the required storage area and executes necessary operating processes. In other words, transmission of request data D1 by the POS terminal 13 is accompanied by consumption of communication-related resources, and hardware and software resources on the maintenance server 17. By setting the interval at which POS terminals 13 of a company that is not under contract (not within the contract period) send request data D1 longer than the interval at which POS terminals 13 of a company that is in contract (within the contract period) send request data D1, consumption of resources due to transmission of request data D1 by POS terminals 13 belonging to a company that is not in contract can be suppressed, companies that are under contract can be differentiated from companies that are not under contract, and fairness can be maintained.

Transmission of request data D1 from POS terminals 13 belonging to a company that is not under contract could also be stopped completely. However, a company that intends to be in contract could be out of contract at some present time due to a procedural or administrative error, for example. Therefore, by temporarily increasing the request data D1 transmission interval for a company that is out of contract instead of completely stopping transmission of request data D1 from the POS terminals 13 of that company as in this embodiment of the disclosure, unexpected problems resulting from a company that intends to be under contract being completely unable to use functions of the maintenance server 17 can be suppressed. In addition, because the maintenance server 17 determines if a contract is in force each time request data D1 is received, the maintenance server 17 continues determining if a contract is in force whenever request data D1 is received as a result of the POS terminals 13 continuing to send request data D1. As a result, when a new contract is entered, the timing for transmitting request data D1 can be set to the normal transmission time.

Note that as described further below, request data D1 generated while not in contract is not destroyed, and is transmitted to the maintenance server 17 and processed appropriately by the server when the contract is renewed.

After executing the set transmission interval process in step SB6, the communication manager 204 determines if the current time is within the contract period (step SB7).

If not within the contract period (step SB7: NO), the communication manager 204 ends the process. In this event, request data D1 stored in the specific storage area is not deleted and remains stored. When the timing for transmitting the next request data D1 arrives, the request data D1 stored in the specific storage area becomes data to be transmitted (becomes one of the data objects to be transmitted if there are plural request data D1 object stored in the specific storage area).

If in contract (step SB7: YES), the communication manager 204 acquires and outputs the error warning/prediction report data D22 contained in the response data D2 to the log recorder 203 (step SB8).

As shown in column (A) of FIG. 4, the log recorder 203 executes a set generating interval process based on the error warning/prediction report data D22 acquired from the communication manager 204 and the log data D11 generated in the log data generating process of step SA3 (step SA6).

Figure 9:
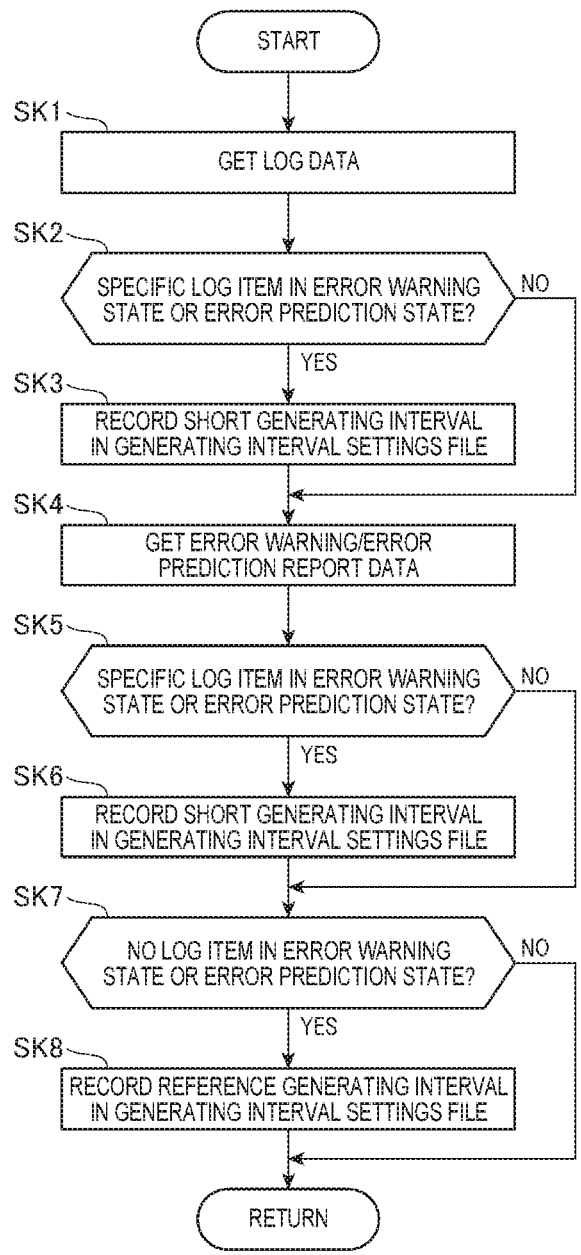
FIG. 9 is a flow chart showing an operation of the POS terminal.

FIG. 9 is flow chart showing the operation of the log recorder 203 when executing the set generating interval process.

As shown in FIG. 9, the log recorder 203 acquires the log data D11 (main log data D11$m$ and sub log data D11$s$) (step SK1).

Next, the log recorder 203 determines based on the log data D11 acquired in step SK1 if a specific log item of the POS terminal 13 is in an error warning state or error prediction state, and if a specific log item of the printer 14 is in an error warning state or an error prediction state (step SK2).

Whether or not a log item is in an error warning state or error prediction state is determined by the same method described above in the error warning/prediction report data generating process. That is, if the condition for an error warning state is met for the RAM usage log item, CPU usage log item, CPU temperature log item, or data transfer rate log item, the log recorder 203 determines that log item is in an error warning state. If the condition for an error prediction state is met for any of these log items, the log recorder 203 determines that log item is in an error prediction state.

The conditions used in step SK2 to determine if a log item is in an error warning state or an error prediction state are previously registered by a specific person using a specific means.

The conditions the maintenance server 17 uses in the error warning/prediction report data generating process (referred to below as "server-side conditions"), and the conditions used by the POS terminal 13 in the process of step SK2 (referred to below as "POS terminal-side conditions"), do not need to be the same.

For example, the content of the POS terminal-side conditions can be set from a different perspective than the server-side conditions, such as someone that knows how the POS terminals 13 are actually used, such as the environment where the POS terminal 13 is installed, setting the POS terminal-side conditions to reflect how the POS terminals 13 are actually used.

If any one log item is in an error warning state or error prediction state (step SK2: YES), the log recorder 203 updates the generating interval settings file 221, and records in the generating interval settings file 221 information indicating an interval shorter than the reference generating interval (referred to below as a "shortened generating interval") (step SK3). Next, the log recorder 203 goes to step SK4. As described above, the reference generating interval is the longest interval that can be set as the interval for generating request data D1 (log data D11). The value (length) of the shortened generating interval is determined by a specific method appropriately to the log item in an error warning state or an error prediction state.

If based on the log data D11 there is no log item in an error warning state or error prediction state (step SK2: NO), the log recorder 203 goes to step SK4.

In step SK4, the log recorder 203 acquires the error warning/prediction report data D22.

Next, based on the error warning/prediction report data D22 acquired in step SK4, the log recorder 203 determines if a specific log item of the POS terminal 13 is in an error warning state or an error prediction state, and determines if a specific log item of the printer 14 is in an error warning state or an error prediction state (step SK5).

If even one log item is in an error warning state or error prediction state (step SK5: YES), the log recorder 203 updates the generating interval settings file 221 and records information indicating the shortened generating interval in the generating interval settings file 221 (step SK6). The log recorder 203 then goes to step SK7. The value (length) of the shortened generating interval is set according to the error warning state or error prediction state of the log item determined in step SK2, and the error warning state or error prediction state of the log item indicated in the error warning/prediction report data D22.

If there is no log item determined to be in an error warning state or error prediction state based on the error warning/prediction report data D22 (step SK7: YES), the log recorder 203 goes to step SK8.

In step SK7, the log recorder 203 determines if it was decided in step SK2 and step SK5 that there is not even one log item that is in an error warning state or an error prediction state.

If it was decided in step SK2 and step SK5 that there is not even one log item that is in an error warning state or an error prediction state (step SK7: YES), the log recorder 203 updates the generating interval settings file 221 and records information indicating the reference generating interval in the generating interval settings file 221 (step SK8). The log recorder 203 then ends the set generating interval process.

If it was decided in step SK2 or step SK5 that there is log item that is in an error warning state or an error prediction state (step SK7: NO), the log recorder 203 ends the set generating interval process.

As described above, in this embodiment of the disclosure, the interval for generating request data D1 (log data D11) is shorter when a specific log item is in an error warning state or error prediction state (when the possibility of an error is high) than when not. The effect of this is described next.

Note that when request data D1 is generated at the shortened generating interval, the timing for transmitting the request data D1 is basically the normal transmission time, and the request data D1 transmission interval is therefore also shortened.

More specifically, if a log item is in an error warning state or error prediction state, the possibility of that log item going to an error (a failure occurring) is high. In this event, the maintenance technician needs to monitor the state of that log item at a short interval and take corrective action as required. As described further below, the log storage unit 503 of the maintenance server 17 stores a record based on the request data D1 in the second status information database 514 when request data D1 is received. In addition, the log display unit 504 of the maintenance server 17 reports the status of the POS terminal 13 and printer 14 based on the second status information database 514 when requested by the maintenance technician. By thus shortening the interval for generating and transmitting request data D1 when a log item is in an error warning state or error prediction state, the maintenance technician can monitor the status of the log item at a shorter interval and can take appropriate action as required.

Note that the interval for generating and transmitting request data D1 could be always set to the shortened generating interval. However, transmitting the request data D1 consumes resources as described above. Therefore, by shortening the interval for generating and transmitting request data D1 while a log item is in an error warning state or error prediction state, unnecessary consumption of resources can be suppressed, and the status of the log item can be reported to the maintenance technician as required using an efficient method.

As shown in column (B) of FIG. 4, after outputting the error warning/prediction report data D22 to the log recorder 203 in step SB9, the communication manager 204 acquires and outputs the process command control data D21 contained in the response data D2 to the command execution unit 205 (step SB9).

Next, the communication manager 204 deletes the request data D1 transmitted in step SB4 from the specific storage area (step SB10). As a result of step SB11, request data D1 that was transmitted to the maintenance server 17 and processed (information based on the request data D1 that was stored) by the maintenance server 17 is prevented from being transmitted again.

Next, the communication manager 204 determines if request data D1 is stored in the specific storage area (step SB11). Request data D1 stored in the specific storage area at the time of step SB11, is data that has not been processed by the maintenance server 17 (information based on the request data D1 is not stored).

If request data D1 was stored in the specific storage area (step SB11: YES), the communication manager 204 goes to step SB4.

If request data D1 was not stored in the specific storage area (step SB11: NO), the communication manager 204 ends the process.

As shown in column (C) of FIG. 4, the command execution unit 205 acquires the process command control data D21 input from the communication manager 204 (step SC1).

Next, the command execution unit 205 executes a corresponding process based on the acquired process command control data D21 (step SC2). As described above, control data instructing process execution is contained in the process command control data D21 for each process that should be executed by the command execution unit 205. The command execution unit 205 changes the command language of the control data as required and executes the process. For example, if control data instructing updating the firmware is contained in the process command control data D21, the command execution unit 205 updates the firmware based on the control data.

Next, the command execution unit 205 generates process result data D3 indicating the process result of the process executed based on the process command control data D21 (step SC3).

Next, the command execution unit 205 outputs the generated process result data D3 to the log recorder 203 (step SC4).

As shown in column (A) of FIG. 4, the log recorder 203 acquires and stores the process result data D3 input from the command execution unit 205 in a specific storage area (step SA7), and then returns to step SA1.

As described above, in step SE6 in column (E) of FIG. 4, the response unit 502 outputs the request data D1 to the log storage unit 503.

As shown in column (F) of FIG. 4, the log storage unit 503 receives and acquires the request data D1 input from the log receiver 501 (step SF1).

Next, the log storage unit 503 executes a database registration process (step SF2).

Figure 10:
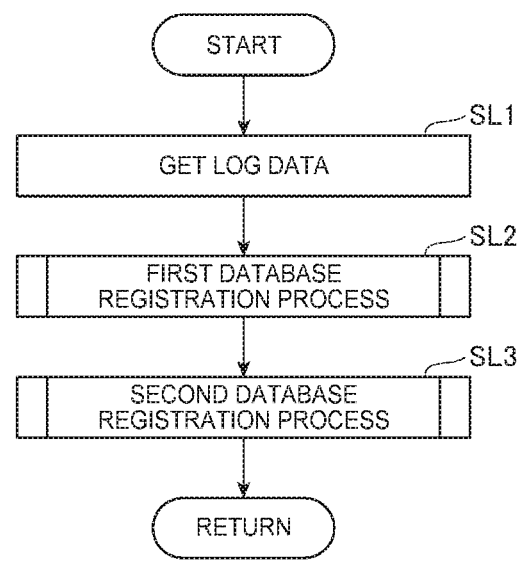
FIG. 10 is a flow chart showing an operation of the maintenance server.

FIG. 10 is a flow chart showing the operation of the log storage unit 503 when executing the database registration process.

As shown in FIG. 10, the log storage unit 503 acquires the log data D11 (main log data D11m and sub log data D11s) contained in the request data D1 (step SL1).

Next, based on the acquired log data D11, the log storage unit 503 executes a first database registration process (step SL2). The first database registration process is described in detail below.

The first database registration process is a process of generating and storing a record based on the status information data contained in the log data D11 in the first status information database 513.

The log storage unit 503 executes the following process to generate a record based on the status information data of one log item. More specifically, the log storage unit 503 generates a record relating the store ID of the corresponding store, identification information (POS terminal ID or printer ID) for the device (POS terminal 13 or printer 14) corresponding to that one log item, and the status information data of that one log item. Note that the log storage unit 503 modifies the status information data contained in the record to match the data structure of records in the first status information database 513.

FIG. 11A illustrates the data structure of a record created based on the RAM usage status information data (status information data) of the RAM usage log item of the POS terminal 13.

For example, the log storage unit 503 executes a process such as described below to create a record based on the RAM usage log item of the POS terminal 13. More specifically, the log storage unit 503 generates a record relating the store ID in the request data D1, the POS terminal ID of the POS terminal 13, and the RAM usage status information data of which the format was changed for compatibility with the data structure of the first status information database 513. As a result, a record such as shown in FIG. 11A is stored in the first status information database 513 as a record based on the RAM usage log item.

In the first database registration process of step SL2, the POS terminal 13 generates by the method described above a record based on the status information data of the log items of the POS terminal 13, and the status information data of the log items of the printer 14, based on the log data D11 (main log data D11m and sub log data D11s), and stores the record in the first status information database 513.

After executing the first database registration process, the log storage unit 503 executes a second database registration process (step SL3). This second database registration process is described below.

The second database registration process is a process of generating and storing in the second status information database 514 a record based on the status information data contained in the log data D11. More specifically, in specific cases the second database registration process creates a record containing state type information as described further below.

Figure 12:
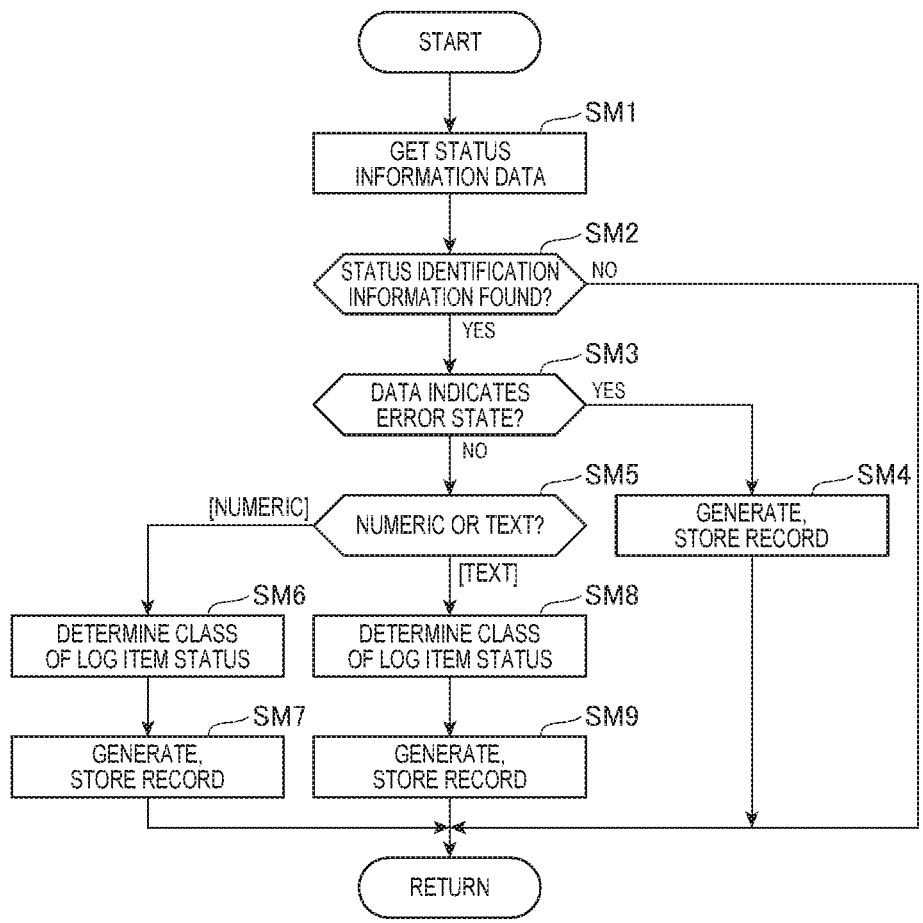
FIG. 12 is a flow chart showing an operation of the maintenance server.

FIG. 12 is a flow chart of the process executed by the log storage unit 503 when creating one record based on status information data for one log item in the second database registration process.

As shown in FIG. 12, the log storage unit 503 acquires status information data from the log data D11 (step SM1).

Next, the log storage unit 503 determines if status identification information is contained in the acquired status information data (step SM2).

If status identification information is not included in the acquired status information data (step SM2: NO), the log storage unit 503 ends the second database registration process. In this case, a record based on the status information data acquired in step SM1 is not created and stored in the second status information database 514. Note that status identification information is not included when the status information data is not data indicating the state of a log item, and when status identification information is not assigned to the status information data, for example.

If status identification information is included in the status information data (step SM2: YES), the log storage unit 503 determines based on value of the status identification information if the status information data is data indicating the error status of a log item (step SM3).

More specifically, in this embodiment of the disclosure the communication error status information data (status information data) of the communication error log item, and the printer error status information data (status information data) of the printer error log item, are examples of status information data that are data indicating the error status of a log item. As described above, this is because this status information data is data that is generated when the state of the log item is an error state.

The state of log items corresponding this status information data has already been confirmed to be an error, and there is no need for classification of the state by the log storage unit 503 as described below.

In step SM3, the log storage unit 503 identifies the log item based on the value of the status identification information, and that if the log item is a communication error log item or a printer error log item, the status information data is data indicating the state of the log item is an error.

If the status information data is data indicating the state of the log item is an error (step SM3: YES), the log storage unit 503 generates and stores a record as described below in the second status information database 514 (step SM4), and ends the second database registration process. More specifically, the log storage unit 503 generates a record relating the store ID of the corresponding store, identification information (POS terminal ID or printer ID) for the device (POS terminal 13 or printer 14) corresponding to that one log item, and class information identifying the error status. Note that the log storage unit 503 modifies the status information data contained in the record to match the data structure of records in the second status information database 514.

The class information is information identifying the class of the log item state. Log item states in this embodiment of the disclosure are divided into four classes: an error state (a state in which a failure has occurred), an error warning state (a state in which a failure has not occurred, but the probability of a failure occurring is high if action is not taken), an error prediction state (a state in which a failure has not occurred but a failure may occur if use continues), and a normal state. The class information is information denoting one of these four states.

FIG. 11B illustrates the data structure of a record created based on the communication error status information data (status information data) of the communication error log item of the POS terminal 13.

For example, the log storage unit 503 executes a process such as described below to create a record based on the communication error log item of the POS terminal 13. More specifically, the log storage unit 503 creates a record relating the store ID in the request data D1, the POS terminal ID of the POS terminal 13, the communication error status information data converted to a format compatible with the data structure of the second status information database 514, and class information indicating the error state. As a result, a record such as shown in FIG. 11B is stored in the second status information database 514 as a record based on the communication error log item.

If step SM3 determines the status information data is not data indicating the state of the log item is an error (step SM3: NO), the log storage unit 503 determines if the status information data is data indicating the status of the log item by a numeric value or data indicating the status of the log item by a text string (step SM5).

In this embodiment of the disclosure, status information data for the RAM usage, CPU usage, CPU temperature, data transfer rate, actual SSD use, cumulative printhead line count, and cumulative cutter operation count log items is data expressing the state of the corresponding log item numerically.

The SSD life indicated by the SSD life information in the status information data of the actual SSD use log item in particular is an example of a log item state expressed numerically.

The remaining usable printhead day count indicated by the remaining usable printhead days information in the status information data of the cumulative printhead line count log item is another log item state expressed numerically.

The remaining usable cutter days indicated by the remaining usable cutter days information in the status information data of the cumulative cutter operation count log item is another log item state expressed numerically.

The status information data for the operating process and connected device log items are examples of data expressing the state of the log item with a text string.

In step SM5, the log storage unit 503 differentiates the log items based on the value of the status identification information, and if the status information data indicates a RAM usage log item, CPU usage log item, CPU temperature log item, data transfer rate log item, actual SSD use log item, cumulative printhead line count log item, or cumulative cutter operation count log item, determines the status information data is data expressing the status of the log item numerically.

In step SM5, the log storage unit 503 differentiates the log items based on the value of the status identification information, and if the status information data indicates an operating process log item or connected device log item, determines the status information data is data expressing the status of the log item by a text string.

If the status information data is data expressing the status of the log item numerically (step SM5: NUMERIC), the log storage unit 503 determines the class of the state of the log item based on the relationship between the numeric value expressing the state of the log item and a specific threshold value (step SM6).

More specifically, a condition for classifying the status of each log item as an error state, error warning state, error prediction state, or normal state is predefined for each log item. The condition is met if the numeric value denoting the status of the log item is in a specific relationship to the specific threshold for that log item.

The conditions for evaluating the error status of a RAM usage log item, CPU usage log item, CPU temperature log item, and data transfer rate log item is whether or not the numeric value exceeds the specific threshold set for that log item.

The condition for evaluating the error status of the actual SSD use is whether or not the SSD life is shorter than a previously set threshold.

The condition for evaluating the error status of the cumulative printhead line count log item and cumulative cutter operation count log item is whether or not the remaining number of usable days of the printhead 211 or cutter 212 is less than a specific threshold.

Note that the condition applied to a specific log item may the same as the condition used in the error warning/prediction report data generating process described above.

These conditions can also be changed by the maintenance technician or administrator, for example, using a specific means.

Next, the log storage unit 503 creates a record relating the store ID of the corresponding store, identification information (POS terminal ID or printer ID) for the device (POS terminal 13 or printer 14) corresponding to the log item of the status information data acquired in step SM1, the status information data acquired in step SM1, and the class information identifying the class determined in step SM6. The log storage unit 503 then stores the record in the second status information database 514 (step SM7).

Next, the log storage unit 503 ends the second database registration process. Note that the log storage unit 503 modifies the status information data contained in the record to match the data structure of records in the second status information database 514.

FIG. 11C illustrates the data structure of a record created in step SM6 based on the RAM usage status information data (status information data) of the RAM usage log item of the POS terminal 13.

For example, the log storage unit 503 executes a process such as described below to create a record based on the RAM usage log item of the POS terminal 13. More specifically, the log storage unit 503 generates a record relating the store ID in the request data D1, the POS terminal ID of the POS terminal 13, the RAM usage status information data converted to a format compatible with the data structure of the second status information database 514, and the class information indicating the classification determined in step SM6. As a result, a record such as shown in FIG. 11C is stored in the second status information database 514 as a record based on the RAM usage log item.

As will be understood by comparing the record shown in FIG. 11A and the record shown in FIG. 11C, class information is not added to the records stored in the first status information database 513, but class information is added to the records stored in the second status information database 514.

If the status information data is a text string expressing the status of the log item (step SM5: TEXT), the log storage unit 503 determines classifies the status of the log item based on the content of the text string expressing the status of the log item (step SM8).

Describing the process executed in step SM8 when the log item of the status information data is the operating process log item more specifically, processes that must be in an operating state (referred to below as "required processes"), and processes that must not be in a non-operating state (referred to below as "non-essential processes"), are predefined for each POS terminal 13, and are registered relationally to the POS terminal ID of the POS terminal 13 or the printer ID of the printer 14.

In step SM8, the log storage unit 503 applies string searching technology, for example, to evaluate the state of log items expressed by a text string and determine the operating state of required processes and non-essential processes. If a required process is in an operating state, or a non-essential process is not in an operating state, the log storage unit 503 determines the status of that log item is normal.

If a required process is not in an operating state, or a non-essential process is in an operating state, the log storage unit 503 determines the status of that log item is an error state.

Required processes and non-essential processes can be changed by the maintenance technician or administrator by a specific means.

Describing the process executed in step SM8 when the log item of the status information data is the connected device log item more specifically, devices that must be connected (referred to below as "required devices"), and devices that must not be connected (referred to below as "non-essential devices"), are predefined for each POS terminal 13, and are registered relationally to the POS terminal ID of the POS terminal 13 or the printer ID of the printer 14.

In step SM8, the log storage unit 503 applies string searching technology, for example, to evaluate the state of log items expressed by a text string and determine whether or not a required device or a non-essential device is connected. If a required device is connected, and a non-essential device is not connected, the log storage unit 503 determines the status of that log item is normal. If a required device is not connected, or a non-essential process is connected, the log storage unit 503 determines the status of that log item is an error state.

Required devices and non-essential devices can be changed by the maintenance technician or administrator by a specific means.

Next, the log storage unit 503 creates a record relating the store ID of the corresponding store, identification information (POS terminal ID or printer ID) for the device (POS terminal 13 or printer 14) corresponding to the log item of the status information data acquired in step SM1, the status information data acquired in step SM1, and the class information identifying the class determined in step SM8. The log storage unit 503 then stores the record in the second status information database 514 (step SM9).

Next, the log storage unit 503 ends the second database registration process. Note that the log storage unit 503 modifies the status information data contained in the record to match the data structure of records in the second status information database 514.

FIG. 11D illustrates the data structure of a record created in step SM9 based on the operating process status information data (status information data) of the operating process log item of the POS terminal 13.

For example, the log storage unit 503 executes a process such as described below to create a record based on the operating process log item of the POS terminal 13. More specifically, the log storage unit 503 generates a record relating the store ID in the request data D1, the POS terminal ID of the POS terminal 13, the operating process status information data converted to a format compatible with the data structure of the second status information database 514, and the class information indicating the classification determined in step SM8. As a result, a record such as shown in FIG. 11D is stored in the second status information database 514 as a record based on the operating process log item.

In the second database registration process, the log storage unit 503 applies the process of the flow chart shown in FIG. 12 to each status information data object in the request data D1, and generates and stores a record in the second status information database 514.

As described above, in the database registration process of step SF2 in FIG. 4, the log storage unit 503 does not add class information when storing records based on the status information data in the first status information database 513. However, when storing records based on the status information data in the second status information database 514, the log storage unit 503 determines the class of the state of the log item in the status information data and adds information denoting the class to the record.

This process has the following effect.

Specifically, data of the same content as the status information data from which the record was created is contained in each record in the first status information database 513. It is therefore possible to classify the state of a log item using a condition different from the condition used to create a record in the second status information database 514, and analyze the state of other log items, based on a record in the first status information database 513.

In addition, class information indicating the class determined by a specific method is added to a specific record in the second status information database 514. Based on a specific record in the second status information database 514, it is therefore possible to execute a process appropriate to the class of the state of the corresponding log item, and immediately report the class of the state of the log item, for example.

Note that the information stored in the second status information database 514 with added class information is an example of processed status information.

The operation of devices when the status of a POS terminal 13 and printer 14 is managed by the maintenance server 17 is described above. As described above, the POS terminal 13 generates request data D1 at a predetermined interval, and sends request data D1 including log data D11 as a request. Based on the received request data D1, the maintenance server 17 generates records in the first status information database 513 and second status information database 514 to manage the status of log items (the status of the POS terminal 13 and printer 14). The maintenance server 17 also sends response data D2 to the POS terminal 13 in response, and causes the POS terminal 13 to execute a required process. By executing these processes, the status of the POS terminal 13 and printer 14 can be continuously and efficiently monitored by the maintenance server 17.

Processes of the log recorder 203, communication manager 204, and command execution unit 205 are described above.

These function blocks are configured so that functions can be added to the programs (programs embodying the function of specific function blocks) corresponding to the function blocks by adding a specific plug-in. Thus comprised, the functions of the log recorder 203, communication manager 204, and command execution unit 205 can be added as required by a flexible, simple means.

The log display unit 504 of the maintenance server 17 is described next.

Based on the second status information database 514, the log display unit 504 reports information related to the status of log items of a specific device (POS terminal 13 or printer 14) to the maintenance technician (or other authorized person).

A maintenance technician wanting information related to the status of log items related a specific POS terminal 13 or printer 14 starts a web browser of a terminal to which a web browser is installed, and accesses a specific URL on the maintenance server 17. The maintenance technician may execute this operation after receiving from the store administrator by telephone or e-mail, for example, a report that an error has occurred on a specific POS terminal 13 or printer 14.

After performing the required authentication when the specific URL is accessed, the log display unit 504 sends a specific HTTP file to the terminal to display a user interface (web page) enabling inputting the POS terminal ID or printer ID on the terminal. The maintenance technician then inputs the POS terminal ID of the specific POS terminal 13 or the printer ID of the specific printer 14 to the user interface. The log display unit 504 thus acquires the POS terminal ID or printer ID input to the user interface.

Next, the log display unit 504 references the second status information database 514, and based on the acquired POS terminal ID or printer ID, acquires the required records (including at least the recently stored records) based on the status information data of the log items of the corresponding POS terminal 13 or printer 14.

Next, the log display unit 504 sends a specific HTTP file to the terminal, and displays a user interface (web page, screen) presenting the following information related to the log item. If a communication error or printer error has occurred, the log display unit 504 displays information for communication error and printer error log items in the user interface indicating that an error occurred. By reading the user interface, the maintenance technician can know that a communication error or printer error occurred.

For RAM usage, CPU usage, CPU temperature, data transfer rate, actual SSD use, cumulative printhead line count, and cumulative cutter operation count log items, the log display unit 504 displays information in the user interface indicating the class (error state, error warning state, error prediction state, or normal) of the status of the log item. For operating process and connected device log items, the log display unit 504 displays information in the user interface indicating the class (error state or normal) of the status of the log item.

Based on the class information of the corresponding record, the log display unit 504 displays information indicating the class of the status of those log items.

By referring to the user interface, the maintenance technician can know the class of the status of the log items and take appropriate action based on that knowledge.

As a result, the maintenance technician can get the status of the log items of a desired POS terminal 13 or printer 14 at the desired time by a function of the log display unit 504.

The monitoring unit 505 of the maintenance server 17 is described next.

The monitoring unit 505 is a function block for monitoring whether or not request data D1 (request) was transmitted normally by a POS terminal 13 of the store system 11.

The POS terminal 13 has a function for transmitting to the maintenance server 17 data (on-report data) containing specific information including at least the POS terminal ID of the POS terminal 13 when the power turns on. This data is data indicating that the power was turned on.

The POS terminal 13 also has a function for transmitting to the maintenance server 17 data (off-report data) containing specific information including at least the POS terminal ID of the POS terminal 13 when the power is turned off but before executing the shutdown process invoked by turning the power off.

Using the above processes of the POS terminal 13, the monitoring unit 505 in this embodiment of the disclosure efficiently monitors whether or not request data D1 was transmitted normally by the POS terminal 13.

In the following description, the monitoring unit 505 monitoring whether or not request data D1 was transmitted normally by the POS terminal 13 is referred to below as log communication monitoring.

Figure 13B:
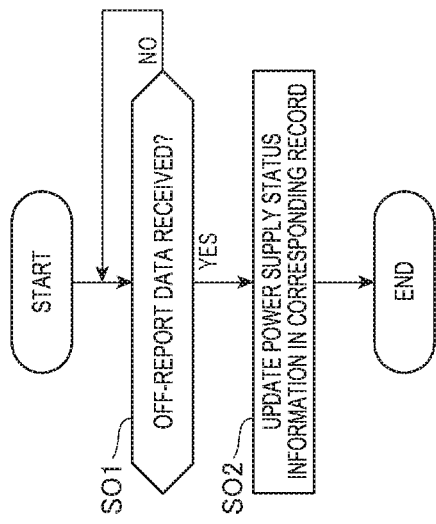
FIG. 13A and FIG. 13B are flow charts showing operations of the maintenance server.
Figure 13A:
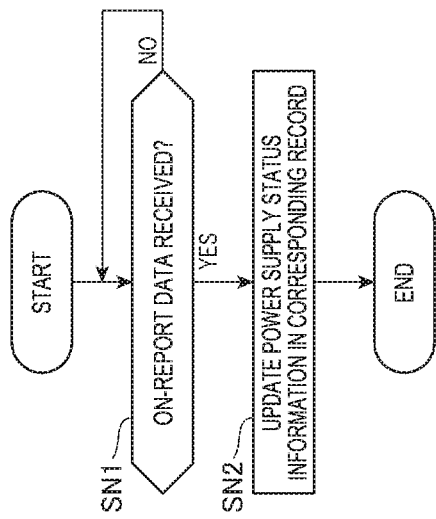

FIG. 13A is a flow chart of the process executed by the monitoring unit 505.

As shown in FIG. 13A, the monitoring unit 505 monitors if on-report data was received from any of the POS terminals 13 being monitored (step SN1).

If on-report data was received (step SN1: YES), the monitoring unit 505 accesses the power supply status monitoring database 515 and sets the value of the power supply state information in the record corresponding to the POS terminal 13 that transmitted the on-report data to a value indicating that the power was turned on (step SN2).

FIG. 14 shows the data structure of a record in the power supply status monitoring database 515.

The power supply status monitoring database 515 has a record for each POS terminal 13, and each record relationally stores the store ID of the store where the POS terminal 13 is located, the POS terminal ID of the POS terminal 13, and power supply state information as shown in FIG. 14.

The power supply state information is information indicating if the power of the POS terminal 13 was turned on or not, and may be set to either a value indicating the power is on or a value indicating the power is not on.

In step SN2, the monitoring unit 505 retrieves the record in the power supply status monitoring database 515 identified by the POS terminal ID contained in the on-report data received in step SN1. Next, the monitoring unit 505 sets the value of this power supply state information in the retrieved record to the value indicating the power is on.

FIG. 13B is a flowchart of the process executed by the monitoring unit 505.

As shown in FIG. 13B, the monitoring unit 505 monitors whether or not off-report data was received from any of the POS terminals 13 being monitored (step S01).

If off-report data was received (step S01: YES), the monitoring unit 505 accesses the power supply status monitoring database 515 and sets the value of the power supply state information in the record corresponding to the POS terminal 13 that transmitted the off-report data to a value indicating that the power was turned off (step SO2).

In step SO2, the monitoring unit 505 retrieves the record in the power supply status monitoring database 515 identified by the POS terminal ID contained in the off-report data received in step S01. Next, the monitoring unit 505 sets the value of this power supply state information in the retrieved record to the value indicating the power is not on.

As described above, when the power of one POS terminal 13 is turned on, the value of the power supply state information in the corresponding record of the power supply status monitoring database 515 is set to a value indicating the power is on. When the power of one POS terminal 13 is turned off, the value of the power supply state information in the corresponding record of the power supply status monitoring database 515 is set to a value indicating the power is not on. As a result, the monitoring unit 505 can monitor whether a particular POS terminal 13 is on or not on based on the value of the power supply state information.

The monitoring unit 505 executes the following process for each store system 11 (the local area network LN of the store system 11), and determines whether or not the POS terminals of the store system 11 (the POS terminals 13 connected to the local area network LN) are targets for log communication monitoring.

Below, the operation of setting a POS terminal 13 of a particular store system 11 as a target for log communication monitoring is referred to below as setting the store system 11 as a target for log communication monitoring.

Figure 15:
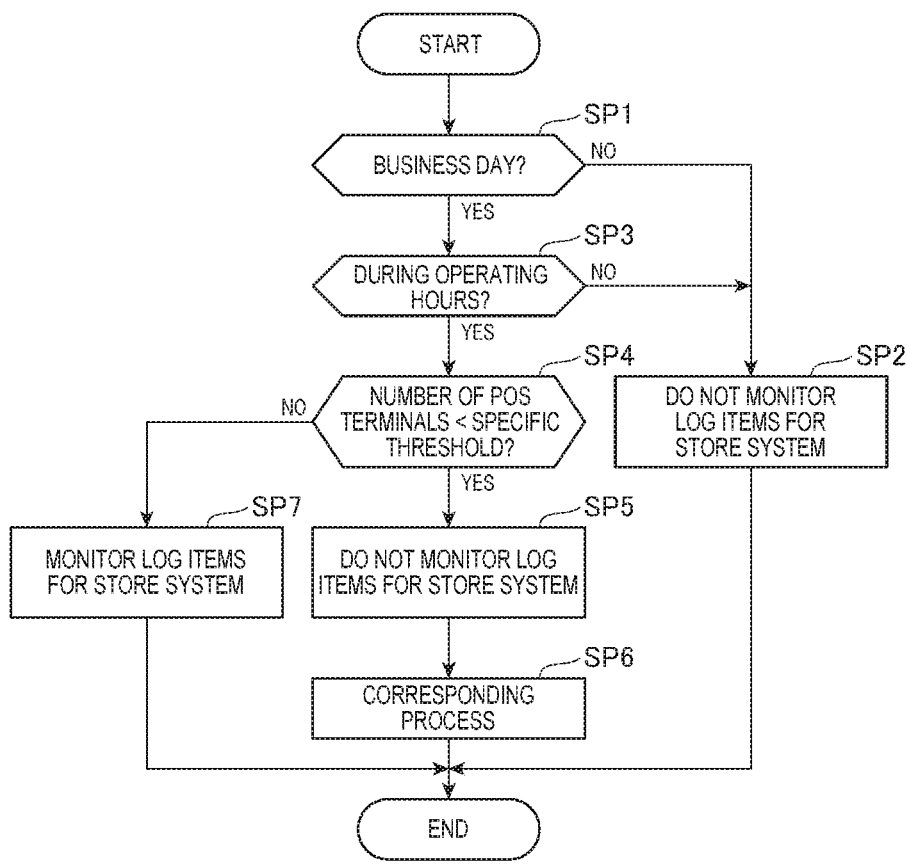
FIG. 15 is a flow chart showing an operation of the maintenance server.

FIG. 15 is a flow chart of the operation of the monitoring unit 505 when determining whether or not to set a particular store system 11 as a target for log communication monitoring.

The monitoring unit 505 applies the process shown in the flow chart in FIG. 15 to each store system 11 at a specific time to determine whether or not to set that store system 11 as a target for log communication monitoring.

In the following description referring to the flow chart in FIG. 15, the store system 11 targeted for processing is referred to as a "target store system."

As shown in FIG. 15, the monitoring unit 505 determines if the store where the target store system is located is open for business that day (referred to herein as a business day) (step SP1). The monitoring unit 505 manages the business days of each store.

If that day is not a business day of the store where the target store system is deployed (step SP1: NO), the monitoring unit 505 does not set that target store system as a target for log communication monitoring that day (step SP2). The monitoring unit 505 then ends the process.

If that day is a normal business day of the store where the target store system is deployed (step SP1: YES), the monitoring unit 505 determines if the current time is within a specific time period (referred to below as the "operating hours") reflecting the operating hours of the store where the target store system is located plus a specific margin based on a preparation period before the store opens and a cleanup period after business ends (step SP3).

If the current time is not within the operating hours (step SP3: NO), the monitoring unit 505 does not set the target store system as a target for log communication monitoring (step SP2). The monitoring unit 505 then ends the process.

If the store is not open that day, or if the store is open that day but the current time is not within the operating hours, the power of the POS terminals 13 of the store system 11 is assumed to not be on, and there is therefore no need to monitor the POS terminal 13 for log communication. If the present date and time do not indicate a business day for the corresponding store or a time outside the operating hours, the monitoring unit 505 in this embodiment does not set the target store system as a target for log communication monitoring. As a result, unnecessarily monitoring a POS terminal 13 for log communication can be prevented.

If the current time is within the operating hours (step SP3: YES), the monitoring unit 505 determines if the number of POS terminals 13 in the target store system that are on is less than a specific threshold number of POS terminals 13 (step SP4).

Note that the monitoring unit 505 gets the number of POS terminals 13 in the target store system that are on based on the power supply status monitoring database 515.

This specific threshold is the minimum number of POS terminals 13 that must be turned on in the store during normal operating hours. The specific threshold number is previously set for each store system 11.

If the number of POS terminals 13 that are on is less than the threshold (step SP4: YES), the monitoring unit 505 does not set that store system as a target for log communication monitoring (step SP5). The reason for this is described next.

That the number of POS terminals 13 that are on is less than the threshold means that the number of POS terminals 13 required for normal business operations are not turned on and business cannot proceed as usual. Because a problem in the store system 11 can be expected in this event, it is necessary to first resolve the problem. Furthermore, even if the store system 11 is set as a target for log communication monitoring when there is a problem in the store system 11, the accuracy of log communication monitoring cannot be assured due to the problem that occurred. As a result, if the number of POS terminals 13 that are on is less than the specific threshold, the monitoring unit 505 does not set that store system 11 as a target for log communication monitoring.

If the target store system is not a target for log communication monitoring, the monitoring unit 505 executes an appropriate handling process (step SP6). Next, the monitoring unit 505 ends the process.

The monitoring unit 505 may report to the maintenance technician or other person, for example, in step SP6. For this report, the monitoring unit 505 may, for example, present on a specific display device that can be read by the maintenance technician information indicating the store ID of the store where the target store system is located, and a message indicating that the number of POS terminals 13 that are on in the store is few and there may be a problem. For this report, the monitoring unit 505 may, for example, send to a previously registered specific address an e-mail with information including the store ID of the store where the target store system is located, and a message indicating that the number of POS terminals 13 that are on is few and there may be a problem.

However, if the number of POS terminals 13 that are on is not less than the specific threshold (step SP4: NO), the monitoring unit 505 sets that target store system as a target for log communication monitoring (step SP7).

The operation of the monitoring unit 505 when monitoring (log communication monitoring) if request data D1 was sent normally to a POS terminal 13 of the store system 11 that was set as a target for log communication monitoring is described next.

Figure 16:
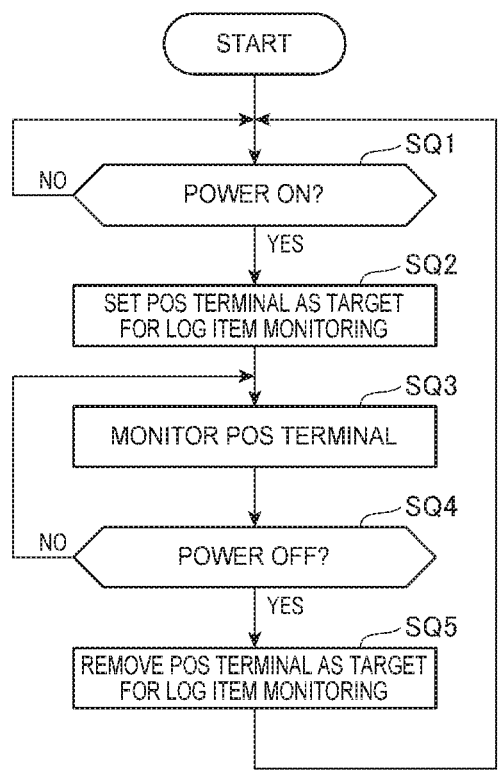
FIG. 16 is a flow chart showing an operation of the maintenance server.

FIG. 16 is a flow chart of the operation of the monitoring unit 505 when executing a process related to monitoring a particular POS terminal 13.

The monitoring unit 505 applies the process shown in the flow chart in FIG. 16 to each POS terminal 13 of the store system 11 set as a target for log communication monitoring, and monitors whether or not request data D1 was transmitted normally by the POS terminal 13.

Note that the power of the POS terminal 13 is not on when the process of the flow chart shown in FIG. 16 starts.

The POS terminal 13 that is the target of the process described using the flow chart in FIG. 16 is referred to below as the target POS terminal 13.

The monitoring unit 505 applies the process shown in the flow chart in FIG. 16 to the POS terminals 13 of a company that is under contract (within the contract period). The maintenance server 17 can therefore provide different services to companies that are under contract and companies that are not.

As shown in FIG. 16, the monitoring unit 505 monitors for the power of a target POS terminal to turn on (step SQ1). In step SQ1, the monitoring unit 505 determines the power of the target POS terminal turned on if the value of the power supply state information stored in the record in the power supply status monitoring database 515 corresponding to the target POS terminal changed from the value indicating the power is not on to the value indicating the power is on.

If the power of the target POS terminal turned on (step SQ1: YES), the monitoring unit 505 monitors the target POS terminal for normal transmission of request data D1 (step SQ2).

The monitoring unit 505 monitors whether or not a target POS terminal set for monitoring normally transmitted request data D1 as described below (step SQ3).

More specifically, the monitoring unit 505 determines request data D1 was not transmitted normally by the target POS terminal if request data D1 was not transmitted (request data D1 was not received from the target POS terminal) during a period reflecting the reference generating interval (the longest interval for a POS terminal 13 of a company within contract to generate and transmit request data D1) plus a specific time margin.

As described above, because a POS terminal 13 of a company under contract is configured to transmit request data D1 at an interval of which the maximum is the reference generating interval, an error of some kind has likely occurred if request data D1 is not transmitted during the period equal to the reference generating interval plus a specific margin.

If request data D1 has not been transmitted normally by the target POS terminal, the monitoring unit 505 reports the same to the maintenance technician or other administrator.

For example, the monitoring unit 505 may display information indicating the POS terminal ID of the target POS terminal, and information indicating request data D1 was not transmitted normally, on a specific display device that can be seen by the maintenance technician. Further alternatively, the monitoring unit 505 may send to a specific previously registered address an e-mail containing information denoting the POS terminal ID and information indicating request data D1 was not transmitted normally.

The monitoring unit 505 monitors if the power of the target POS terminal turned off while monitoring in step SQ3 if request data D1 was transmitted normally by the target POS terminal (step SQ4). In step SQ4, if the value of the power supply state information stored in the record of the power supply status monitoring database 515 corresponding to the target POS terminal changes from the value denoting the power is on to the value denoting the power is off, the monitoring unit 505 determines the power of the target POS terminal turned off.

If the power is off (step SQ4: YES), the monitoring unit 505 removes that target POS terminal from the group of target POS terminals to monitor for transmission of request data D1 (step SQ5), and then returns to step SQ1.

As described above, in this embodiment of the disclosure, the monitoring unit 505 monitors whether or not the power of a particular POS terminal 13 is on or not using on-report data and off-report data transmitted by the POS terminal 13. If the power is on, the monitoring unit 505 monitors if request data D1 is transmitted normally by the terminal, and if the power is off, does not monitor for normal transmission of request data D1.

The effect of this is described below.

More specifically, instead of enabling processing transactions at all times at all checkout counters L in a store, stores generally enable transaction processing at any particular checkout counter L based on the time of day and how busy the store is at a particular time. If transaction process is disabled at a particular checkout counter L, the power of the POS terminal 13 may be turned off. A POS terminal 13 that is turned off does not transmit request data D1, but this is because request data D1 is not transmitted as a result of the power being intentionally turned off because the POS terminal 13 is not used, and is not because request data D1 is not transmitted as a result of an error on the POS terminal 13, for example. Therefore, by only monitoring if request data D1 is transmitted normally by POS terminals 13 that are turned on, mistakenly determining an error has occurred and executing an error handling process unnecessarily can be prevented, POS terminals 13 that should be monitored can be monitored, and processing is efficient.

The operation of a POS terminal 13 installed in the store when the POS terminal 13 is turned on is described next.

Figure 17:
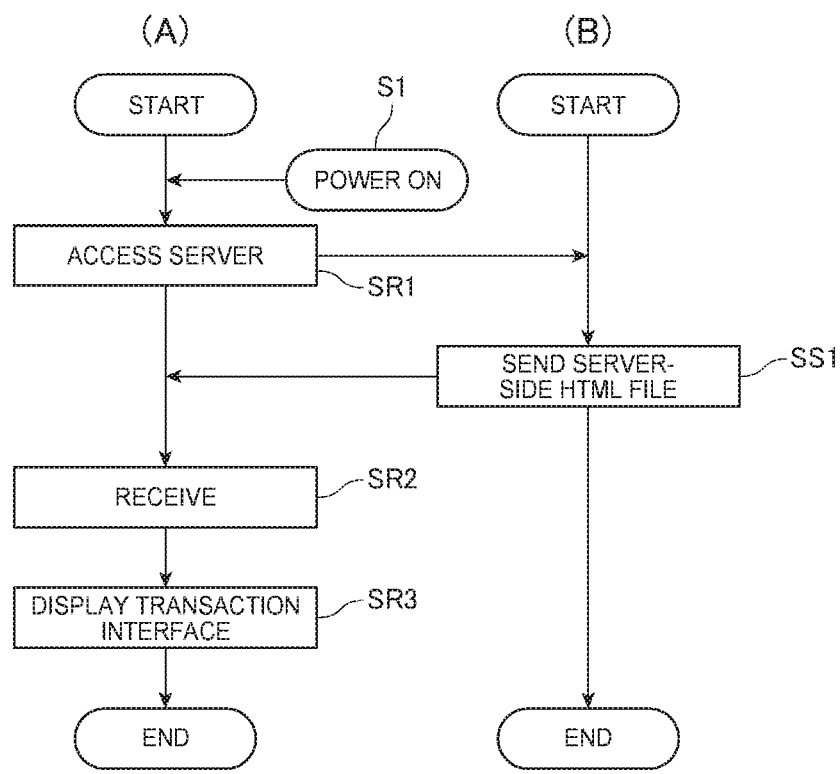
FIG. 17 is a flow chart showing an operation of the POS terminal and store management server.

FIG. 17 is a flowchart showing the operation of the POS terminal 13 and store management server 12 when the POS terminal 13 is turned on. Column (A) of FIG. 17 shows the operation of the POS terminal 13, and column (B) shows the operation of the store management server 12.

The checkout clerk first turns the POS terminal 13 on (step S1). In this example, the POS terminal 13 is installed at a checkout counter L, and the checkout clerk turns the POS terminal 13 on before the store opens each day. In this example, the POS terminal 13 is configured to automatically start a specific web browser when the POS terminal 13 turns on.

As shown in column (A) of FIG. 17, when the browser starts, the client function unit 202 of the POS terminal 13 accesses a specific URL on the store management server 12 (step SR1). The URL of the store management server 12, the format of data exchanged in communication with the store management server 12, and other information required to communicate with the store management server 12 is previously registered in the POS terminal 13.

As shown in column (B) of FIG. 17, when the specific URL is accessed by the POS terminal 13, the transaction-related process execution unit 401 of the store management server 12 controls the store management server communication unit 42 to send a specific HTML file to the POS terminal 13 (step SS1). The specific HTML file is an HTML file having at least a function for displaying the user interface for processing transactions 60 described below.

As shown in column (A) of FIG. 17, the client function unit 202 of the POS terminal 13 controls the control device communication unit 23 to receive and acquire the specific HTML file (step SR2).

The client function unit 202 executes the acquired specific HTML file, and displays a user interface for processing transactions 60 (FIG. 18) on the touch panel TP (step SR3).

Figure 18:
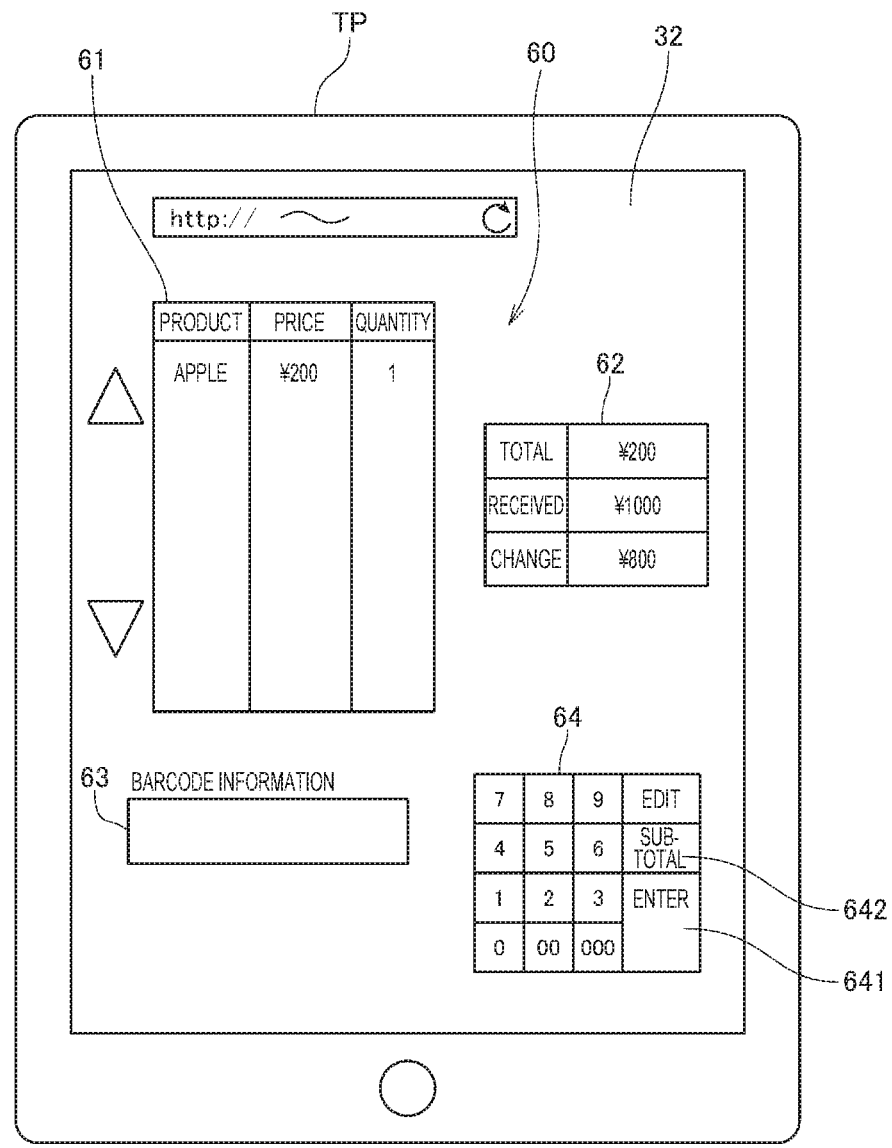
FIG. 18 shows an example of a user interface for processing transactions.

FIG. 18 shows an example of a user interface for processing transactions 60 that is displayed on the touch panel TP.

A list display area 61 where the names of the products being purchased by the customer, the prices of the products, and the quantities of the products are presented in a list is displayed at the top left of the user interface for processing transactions 60 in FIG. 18. To the right of this list display area 61 is presented an amount display area 62 where the total amount of the products being purchased by the customer, the amount of money received from the customer in the transaction, and the amount of change due to the customer are displayed.

Below the list display area 61 is a barcode information display area 63 the information (referred to below as barcode information) expressed by the barcode that is read by the barcode scanner BS is displayed. The barcode information is basically the product code assigned to the product.

A virtual keypad 64 is displayed on the right side of the barcode information display area 63.

The virtual keypad 64 includes an Enter key 641 for finalizing the transaction, and a Subtotal key 642 for calculating the subtotal (the total of the products purchased by the customer).

The checkout clerk then processes the transaction using the user interface for processing transactions 60 at the checkout counter L.

As described above, a user interface for processing transactions 60 used to process a transaction (business) at the checkout counter L is automatically displayed on the touch panel TP of the POS terminal 13 when the POS terminal 13 turns on. As a result, there is no need for the operator to input the URL of the store management server 12, for example, when the POS terminal 13 turns on, and the productivity of the operator and user convenience are improved.

The transaction process executed by the POS terminal 13 during a transaction at the checkout counter L is described next.

Figure 19:
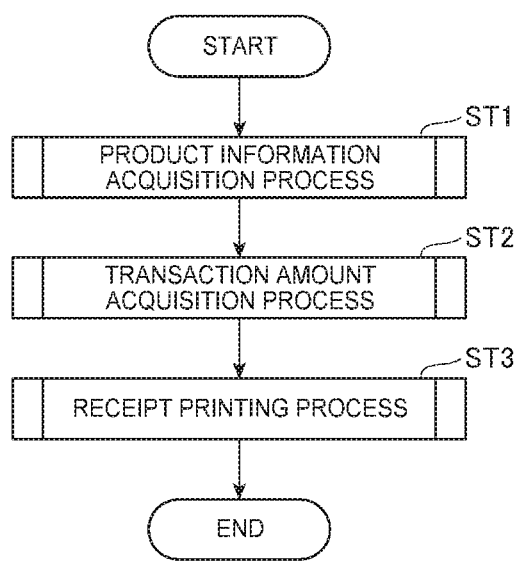
FIG. 19 is a flow chart showing an operation of the POS terminal.

FIG. 19 is a flow chart of the operation of the POS terminal 13 when executing the transaction process.

As shown in FIG. 19, during the transaction process, the client function unit 202 of the control device controller 20 of the POS terminal 13 first executes a product information acquisition process (step ST1).

In the product information acquisition process, the client function unit 202 communicates with the store management server 12 to acquire the name and price of each item the customer purchases (referred to below as product-related information), and executes processes based on the acquired product-related information. This product information acquisition process is described further below.

Figure 20:
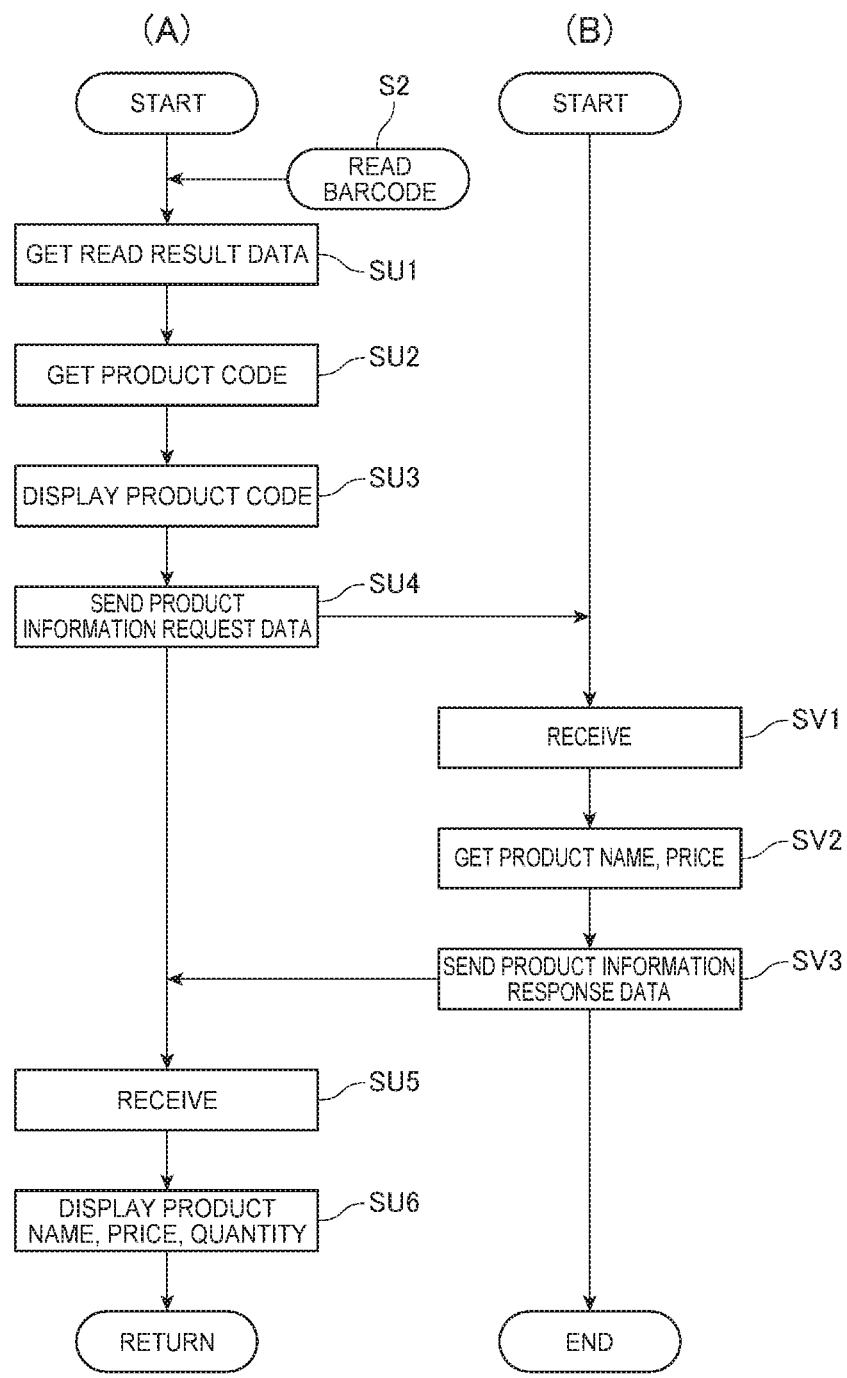
FIG. 20 is a flow chart showing an operation of the POS terminal and store management server.

FIG. 20 is a flow chart of the operation of the POS terminal 13 and the store management server 12 when executing the product information acquisition process. Column (A) of FIG. 20 shows the operation of the POS terminal 13, and column (B) of FIG. 20 shows the operation of the store management server 12.

In the transaction process at the checkout counter L, the checkout clerk reads the barcode on the product or the packaging of the product being purchased by the customer with the barcode scanner BS (step S2). Upon reading a barcode, the barcode scanner BS sends data based on the read result (referred to below as the "read result data") through the port to which the barcode scanner BS is connected to the control device-side device communication unit 24 of the POS terminal 13. The control device-side device communication unit 24 then outputs the read result data to the control device controller 20.

The read result data is data including information indicating the product code of the product.

As shown in column (A) of FIG. 20, the client function unit 202 of the control device controller 20 of the POS terminal 13 then acquires the read result data based on the input from the control device-side device communication unit 24 (step SU1).

Next, the client function unit 202 acquires the product code based on the read result data (step SU2).

Next, the client function unit 202 displays the product code acquired in step SU2 in the barcode information display area 63 of the user interface for processing transactions 60 (step SU3).

Next, the client function unit 202 controls the control device communication unit 23 to send the product name for the product code acquired in step SU2 and data querying the price of the product (referred to below as product information request data) to the store management server 12 (step SU4).

As shown in column (B) of FIG. 20, the transaction-related process execution unit 401 of the store management server controller 40 of the store management server 12 controls the store management server communication unit 42 to receive the product information request data (step SV1).

Next, the transaction-related process execution unit 401, based on the received product information request data, acquires the product code, references the product master database 411 stored by the store management server storage unit 41, and acquires the name and price of the produce identified by the acquired product code (step SV2).

The process of step SV2 is equivalent to a request by the store management server 12 (server).

Next, the transaction-related process execution unit 401 controls the store management server communication unit 42 to send product information response data expressing the product name and price information acquired in step SV2 to the POS terminal 13 (step SV3).

The product information response data corresponds to a response, and the process of step SV3 is equivalent to a process of transmitting a response indicating the result of a process corresponding to the request.

As shown in column (A) of FIG. 20, the client function unit 202 of the control device controller 20 of the POS terminal 13 then controls the control device communication unit 23 to receive the product information response data (step SU5).

Next, the client function unit 202 acquires the product name and product price information based on the received product information response data, and displays the name, price, and quantity of the product in the corresponding fields of the list display area 61 in the user interface for processing transactions 60 (step SU6).

In the product information acquisition process, the checkout clerk reads the barcode with the barcode scanner BS from each product being purchased by the customer, and the POS terminal 13 and store management server 12 execute the process shown in the flow chart in FIG. 20 based on the read barcode.

When reading the barcode from every product and processing by each device based on the read barcode is completed, the product information acquisition process shown in step ST1 in FIG. 19 ends.

When the barcode of every product has been read and processing by each device based on the read barcode is completed, the name, price, and quantity of each product the customer purchases is displayed in the list display area 61.

As shown in FIG. 19, after completing the product information acquisition process in step ST1, the client function unit 202 executes a transaction amount acquisition process (step ST2). In the transaction amount acquisition process of step ST2, the client function unit 202 acquires the total amount of the products purchased by the customer, and acquires the amount of change due based on the amount received from the customer. This transaction amount acquisition process is described further below.

Figure 21:
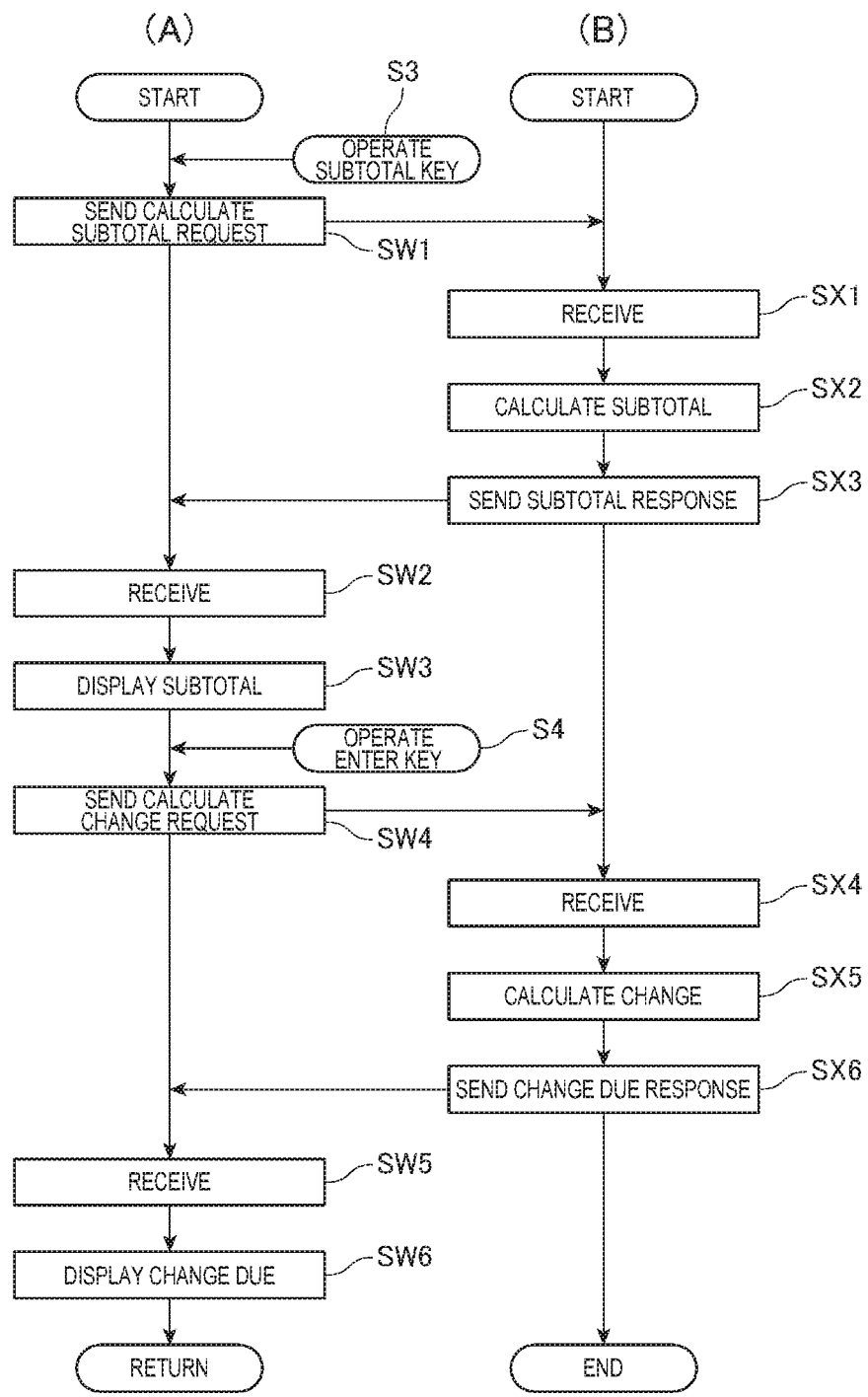
FIG. 21 is a flow chart showing an operation of the POS terminal and store management server.

FIG. 21 is a flow chart showing the operation of the POS terminal 13 and the operation of the store management server 12 in the transaction amount acquisition process. Column (A) of FIG. 21 shows the operation of the POS terminal 13, and column (B) of FIG. 21 shows the operation of the store management server 12.

When reading the barcode from every product is completed, the checkout clerk operates the Subtotal key 642 of the virtual keypad 64 (step S3).

As shown in column (A) of FIG. 21, when operation of the Subtotal key 642 is detected, the client function unit 202 of the control device controller 20 of the POS terminal 13 generates a subtotal calculation request requesting calculating the subtotal, and controls the control device communication unit 23 to send the request to the store management server 12 (step SW1). When the subtotal calculation request is sent, the client function unit 202 starts counting how much time passes.

As shown in column (B) of FIG. 21, the transaction-related process execution unit 401 of the store management server 12 controls the store management server communication unit 42 to receive the subtotal calculation request (step SX1).

Next, the transaction-related process execution unit 401 calculates the subtotal based on the received subtotal calculation request (step SX2). Note that the transaction-related process execution unit 401 manages the product barcodes of the products purchased by the customer based on the product information response request and associated data received from the POS terminal 13. In step SX2, the transaction-related process execution unit 401 references the product master database 411 based on the managed product barcodes, and calculates the subtotal (the total of the purchased products). The method of calculating the subtotal is not limited to this example, and any appropriate method may be used.

Next, the transaction-related process execution unit 401 sends a subtotal response denoting the calculated subtotal to the POS terminal 13 (step SX3).

As shown in column (A) of FIG. 21, the client function unit 202 of the control device controller 20 of the POS terminal 13 controls the control device communication unit 23 to receive the subtotal response (step SW2).

Next, the client function unit 202, based on the received subtotal response, displays the subtotal (the total of the purchased products) in the appropriate field of the amount display area 62 (step SW3).

When the subtotal is displayed in the amount display area 62, the customer pays the checkout clerk. The checkout clerk receives payment from the customer, inputs the amount received through the virtual keypad 64, and operates the Enter key 641 (step S4). When operation of the Enter key 641 is detected, the client function unit 202 displays the amount received from the customer in the corresponding field of the amount display area 62.

When operation of the Enter key 641 is detected, the client function unit 202 also sends a calculate change request requesting calculating the amount of change due to the store management server 12 (step SW4). When the calculate change request is sent, the client function unit 202 starts counting how much time passes.

As shown in column (B) of FIG. 21, the transaction-related process execution unit 401 of the store management server 12 controls the store management server communication unit 42 to receive the calculate change request (step SX4).

Next, the transaction-related process execution unit 401 calculates the amount of change due (step SX5).

Next, the transaction-related process execution unit 401 sends a change-due response indicating the calculated change that is due to the POS terminal 13 (step SX6).

As shown in column (A) of FIG. 21, the client function unit 202 of the POS terminal 13 controls the control device communication unit 23 to receive the change-due response (step SW5).

Next, the client function unit 202, based on the received change-due response, displays the amount of change in the appropriate field of the amount display area 62 (step SW6).

Based on the change amount displayed in the amount display area 62, the checkout clerk returns change to the customer.

As described above, in the transaction amount acquisition process of step ST2, the client function unit 202 acquires the total of the purchased products, and then gets the amount of change due to the customer based on the amount received from the customer.

As shown in FIG. 19, after the transaction amount acquisition process, the client function unit 202 produces a receipt (step ST3). In the receipt printing process of step ST3, the client function unit 202 communicates with the store management server 12 to produce a receipt printed with information including information related to the products purchased by the customer, and the total of the purchased products. The receipt printing process is described below.

Figure 22:
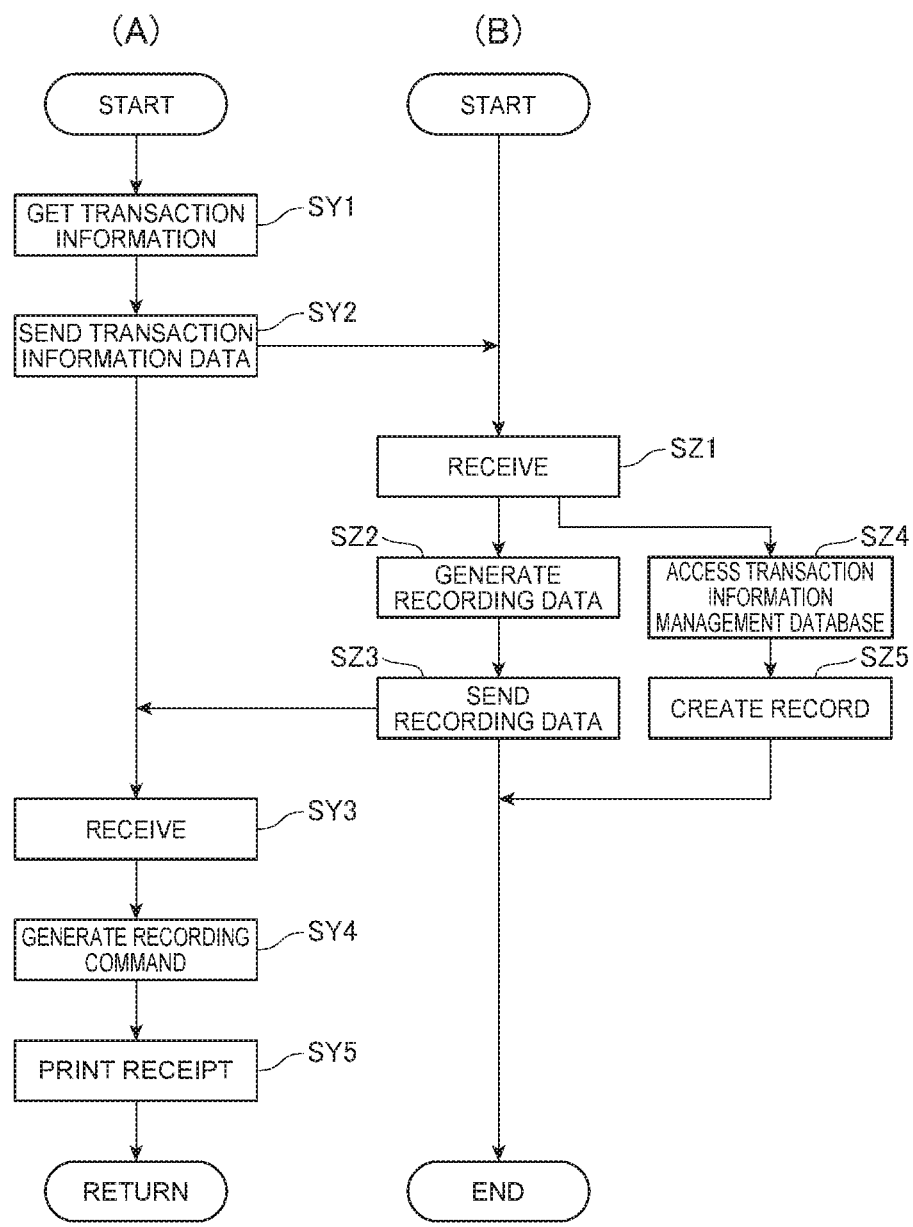
FIG. 22 is a flow chart showing an operation of the POS terminal and store management server.

FIG. 22 is a flowchart showing the operation of the POS terminal 13 and the store management server 12 when executing the receipt printing process. Column (A) of FIG. 22 shows the operation of the POS terminal 13, and column (B) of FIG. 22 shows the operation of the store management server 12.

As shown in column (A) of FIG. 22, when the transaction amount acquisition process ends, the client function unit 202 of the control device controller 20 of the POS terminal 13 acquires the transaction information (step SY1).

The transaction information is information including: identification information uniquely assigned to each transaction (referred to below as transaction identification information); information denoting the combination of product code, name, price, and quantity for each product purchased by the customer (referred to below as the purchased product information); information denoting the subtotal, the cash amount received from the customer, and the change returned to the customer (referred to below as transaction amount information); information denoting the time of the transaction (referred to below as the transaction time information); and the store ID, which is identification information for the store (business) where the transaction was completed.

Note that during a transaction, the client function unit 202 stores information contained the purchased product information and information contained in the transaction amount information to specific storage areas. In step SY1, the client function unit 202 acquires purchased product information and transaction amount information based on the information stored to the specific storage areas.

The time that the transaction was performed as indicated by the transaction time information is the time when the Enter key 641 was operated. The time that the transaction was performed as indicated by the transaction time information is not limited to the time that the Enter key 641 was operated, and may be any time derived from the transaction, such as the time when the barcode for the first product was read in the transaction.

The client function unit 202 also has a function for generating transaction identification information for each transaction, and generates the transaction identification information using this function. The value of the transaction identification information is unique to each transaction performed in each store.

After acquiring the transaction information, the client function unit 202 controls the control device communication unit 23 to send transaction information data expressing the acquired transaction information data to the store management server 12 (step SY2).

As shown in column (B) of FIG. 22, the transaction-related process execution unit 401 of the store management server controller 40 of the store management server 12 controls the store management server communication unit 42 to receive the transaction information data (step SZ1).

Next, the transaction-related process execution unit 401 generates recording data for producing a receipt in a specific layout based on the transaction information indicated by the received transaction information data (step SZ2).

The recording data is control data specifying producing a receipt according to a specific layout, and including in this example a top logo, bottom logo, transaction identification information, the time of the transaction, the name, price, quantity and total amount of the products purchased by the customer, the amount received from the customer, and the amount of change due to the customer. The recording data in this embodiment is an XML document of information written in a specific XML format.

Next, the transaction-related process execution unit 401 controls the store management server communication unit 42 to send the generated recording data to the POS terminal 13 (step SZ3).

After receiving the transaction information data in step SZ1, the transaction-related process execution unit 401 accesses the transaction information management database 412 stored by the store management server storage unit 41 (step SZ4).

Each record in the transaction information management database 412 relationally stores the transaction identification information, purchased product information, transaction amount information, transaction time information, and store ID.

Next, based on the transaction information data received in step SZ2, a record relating the transaction identification information, purchased product information, transaction amount information, transaction time information, and store ID is created in the transaction information management database 412 (step SZ5).

The store management server 12 thus cumulatively stores transaction information appropriate to each transaction. As a result, information such as sales by store and sales by individual product in each store can be managed.

As shown in column (A) of FIG. 22, the client function unit 202 of the control device controller 20 of the POS terminal 13 controls the control device communication unit 23 to receive the recording data (step SY3).

Next, the client function unit 202 generates recording commands in the command language of the process controller 201 based on the recording data of an XML document (step SY4). The client function unit 202 outputs the generated recording commands to the process controller 201.

Next, the process controller 201 controls the control device print unit 21 based on the generated recording commands to produce a receipt (step SY5).

The checkout clerk then gives the receipt produced in step SY5 to the customer.

As described above, the POS terminal 13 in this embodiment of the disclosure executes a transaction process and produces a receipt based on a transaction using functions of the store management server 12. The store management server 12 also cumulatively stores the transaction information derived from the transaction process.

As described above, the POS terminal 13 according to this embodiment has a control device controller 20 configured to change the upper limit of the operating count of mechanisms related to producing receipts (transmits) according to how the mechanisms are actually used, and based on these changed maximum limits, calculates how much longer the mechanisms can be used.

Thus comprised, how much longer mechanisms related to producing receipts can be used can be appropriately calculated to reflect the degree of deterioration of the mechanisms related to receipt production changing according to how the mechanisms are used.

The control device controller 20 in this embodiment of the disclosure calculates how much longer the printhead 211 can be used based on the maximum operating count of the printhead 211 that is changed according to how the printhead 211 is being used.

Thus comprised, how much longer the printhead 211 can be used can be accurately calculated to reflect the characteristics of the particular printhead 211.

To calculate the remaining usable life of the printhead 211, the control device controller 20 in this embodiment of the disclosure changes the maximum operating count of the printhead 211 based on the at least one of the quality, type, and thickness of the stored roll paper (recording media).

Thus comprised, how much longer the printhead 211 can be used can be accurately calculated to reflect the characteristics of the particular printhead 211.

The control device controller 20 in this embodiment of the disclosure also calculates how much longer the cutter 212 can be used based on the maximum operating count of the cutter 212 that is changed according to how the cutter 212 is being used.

Thus comprised, how much longer the cutter 212 can be used can be accurately calculated to reflect the characteristics of the cutter 212.

To calculate the remaining usable life of the cutter 212, the control device controller 20 in this embodiment of the disclosure changes the maximum operating count of the cutter 212 based on the at least one of the quality, type, and thickness of the stored roll paper (recording media).

Thus comprised, how much longer the cutter 212 can be used can be accurately calculated to reflect the characteristics of the cutter 212.

The control device controller 20 in this embodiment of the disclosure also sends information indicating the calculated remaining time that mechanisms used to produce a receipt can be used to the maintenance server 17 (server).

Thus comprised, the maintenance server 17 can execute processes appropriate to the remaining usable time.

The control device controller 20 in this embodiment of the disclosure calculates the remaining number of days that the mechanisms used to produce receipts can be used as the measure of the remaining time that mechanisms used to produce receipts can be used.

Thus comprised, the number of days, which is information that the user can easily grasp, can be provided as the remaining time that mechanisms used to produce receipts can be used.

As described above, a POS terminal 13 (control device) according to this embodiment has a control device controller 20 including a log recorder 203 that generates log data D11 including status information data (status information) indicating the state of log items targeted for monitoring; a communication manager 204 that sends the log data D11 generated by the log recorder 203 as a request to a maintenance server 17 (server), and receives process command control data D21 (control data) as a response from the maintenance server 17; and a command execution unit 205 that executes a process based on the process command control data D21 the communication manager 204 received.

Thus comprised, using the configuration of the POS terminal 13 transmitting log data D11 to the maintenance server 17, the maintenance server 17 can control the POS terminal 13 to execute a specific process based on the process command control data D21 received as a response to the log data D11.

In other words, a system in which log data D11 can be sent from a POS terminal 13 to a maintenance server 17 can execute processes based on the POS terminal 13 transmitting log data D11 to the maintenance server 17.

This embodiment of the disclosure enables adding the functions of the log recorder 203, communication manager 204, and command execution unit 205 by installing a plug-in.

Thus comprised, the functionality of the log recorder 203, communication manager 204, and command execution unit 205 can be added as required by a simple, flexible means.

In this embodiment of the disclosure, the log recorder 203 can acquire the process result of the command execution unit 205, and generate process result report data D12 including information indicating the acquired process result. The communication manager 204 can send the process result report data D12 and log data D11 as requests to the maintenance server 17.

Thus comprised, the POS terminal 13 can quickly report to the maintenance server 17 the results of processes executed based on data received from the maintenance server 17.

In this embodiment of the disclosure, the log recorder 203 generates log data D11 (sub log data D11s) related to a printer 14 (external device) that can communicate through a control device communication unit 23 (communication unit). The communication manager 204 sends the log data D11 (sub log data D11s) related to the printer 14 and generated by the log recorder 203 to the maintenance server 17.

Thus comprised, the POS terminal 13 can report to the maintenance server 17 the status of log items of a printer 14 that is connected to the POS terminal 13.

As described above, the maintenance server 17 (server) according to this embodiment has a maintenance server controller 50 (server controller) including a log receiver 501 that receives log data D11, and a response unit 502 that sends process command control data D21 (control data) causing the POS terminal 13 to execute a specific process based on the received log data D11 as a response.

Thus comprised, the maintenance server 17 can send process command control data D21 to the POS terminal 13 as a response to received log data D11, and cause the POS terminal 13 to execute a specific process. More specifically, a maintenance server 17 in a system in which log data D11 is sent from a POS terminal 13 to the maintenance server 17 thus comprised can execute processes using the configuration of the POS terminal 13 transmitting log data D11.

The response unit 502 in this embodiment of the disclosure acquires executable process information relationally stored to a POS terminal ID (device identification information) contained in the received log data D11, and in response sends process command control data D21 (control data) controlling executing a process (the process identified by the executable process information) corresponding to the acquired executable process information.

Thus comprised, to control a specific POS terminal 13 to execute a specific process, the POS terminal 13 can be controlled to execute the specific process at the timing when the maintenance server 17 transmits the response by previously registering the POS terminal ID of the specific POS terminal 13 relationally to the executable process information identifying the specific process in the maintenance server 17.

The maintenance server 17 in this embodiment of the disclosure has a maintenance server storage unit 51 (server storage unit) that stores information based on log data D11 the log receiver 501 receives.

Thus comprised, the maintenance server 17 can execute processes based on information based on the stored log data D11.

The maintenance server controller 50 in this embodiment of the disclosure has a log display unit 504 that displays a screen (user interface or web page, for example) displaying information based on the log data D11 stored in the maintenance server storage unit 51 on the external device when a request is received from an external device through a global network GN.

Thus comprised, the maintenance server 17 can provide useful information related to the status of log items of the POS terminal 13 through the display.

As also described above, the maintenance server 17 (server) in this embodiment of the disclosure has a maintenance server controller 50 including a monitoring unit 505 configured to monitor whether or not request data D1 is transmitted normally by a POS terminal 13 (control device) that is on and set as a target for monitoring.

Thus comprised, by designating POS terminals 13 that are on as targets for monitoring the normal transmission of request data D1, POS terminals 13 that should be monitored can be targeted for monitoring, processing is efficient, and the processing load of the maintenance server 17 can be reduced.

Once data indicating a POS terminal 13 is on is received, the monitoring unit 505 in this embodiment of the disclosure continues monitoring the POS terminal 13 until data indicating the power turned off is received.

Thus comprised, the maintenance server 17 can use data received from a POS terminal 13 to accurately determine if the power of the POS terminal 13 is on, and can target that POS terminal 13 for monitoring.

The monitoring unit 505 in this embodiment of the disclosure reports when transmission of request data D1 from a POS terminal 13 being monitored is not normal.

Thus comprised, the operator can know that request data D1 is not being transmitted normally.

The monitoring unit 505 in this embodiment of the disclosure acquires how many of the plural POS terminals 13 that are connected to the local area network LN are turned on, and if the acquired number is less than a specific threshold, does not target the plural POS terminals 13 connected to the local area network LN for monitoring.

Thus comprised, if the number of plural POS terminals 13 connected to the local area network LN that are turned on is less than the specific threshold, the POS terminals 13 can be omitted as monitoring targets.

The monitoring unit 505 in this embodiment of the disclosure also does not target for monitoring the plural POS terminals 13 connected to the local area network LN during specific periods of time.

Thus comprised, the POS terminals 13 can be omitted as monitoring targets during specific periods of time corresponding to the actual use of the POS terminals 13.

As described above, in a network system 1 according to this embodiment, the POS terminal 13 (control device) generates log data D11 including status information data (status information) indicating the state of log items targeted for monitoring, and sends the log data D11 generated at a predetermined interval to the maintenance server 17 (server).

The maintenance server 17 stores a contract management database 512 (contract period information) indicating the contract period during which the POS terminal 13 can use functions of the maintenance server 17 by contract, and when log data D11 is received from a POS terminal 13, determines based on the record for that the POS terminal 13 in the contract management database 512 if the contract is current. If the contract is not current, the maintenance server 17 sends a response containing information indicating the contract is not current (has expired) to the POS terminal 13. If the contract is current, the maintenance server 17 sends a response containing information indicating the contract is current to the POS terminal 13.

If information indicating the contract is not current (has expired) is received, the POS terminal 13 sets the interval for transmitting log data D11 to a longer interval than the predetermined interval.

Thus comprised, by setting the interval at which POS terminals 13 of a company that is not under contract (not within the contract period) send request data D1 longer than the interval at which POS terminals 13 of a company that is in contract (within the contract period) send request data D1, consumption of resources by transmission of request data D1 by POS terminals 13 belonging to a company that is not in contract can be suppressed, companies that are under contract can be differentiated from companies that are not under contract, and fairness can be maintained.

More specifically, a system in which the period in which a POS terminal 13 can use functions of the maintenance server 17 is determined by contract can execute an appropriate process when a POS terminal 13 tries to use functions of the maintenance server 17 while a contract is not in effect.

If, after setting the interval for transmitting log data D11 longer than the predetermined interval in response to receiving a response containing information indicating that it is not within the period indicated by the contract period information, a response containing information indicating the POS terminal 13 is under contract is received, the POS terminal 13 in this embodiment of the disclosure sets the interval for transmitting log data D11 to the predetermined interval.

Thus comprised, the interval for transmitting log data D11 by a POS terminal 13 belonging to a company that is under contract can be prevented from being longer than the predetermined interval.

When log data D11 is generated, the POS terminal 13 in this embodiment of the disclosure stores the generated log data D11 and transmits the stored log data D11. The POS terminal 13 deletes the stored log data D11 if, after transmitting the log data D11, information indicating the contract is current is contained in the response received from the maintenance server 17 in response to transmission of the log data D11; and if information indicating the contract is not current is contained in the response, does not delete the stored log data D11 and reserves that log data D11 for transmission the next time a request is sent. When log data D11 is received, the maintenance server 17 determines based on the contract management database 512 if a contract is in effect, acquires the log data D11 and stores information based on the acquired log data D11 if a contract is in effect, and does not store information based on the log data D11 if a contract is not in effect.

Thus comprised, storing information on the maintenance server 17 based on log data D11 for a company that is not under contract is prevented, consumption of resources by transmission of request data D1 by a POS terminal 13 that belongs to a company not under contract can be suppressed, and companies under contract and companies not under contract can be differentiated.

As described above, in this embodiment of the disclosure, a POS terminal 13 (control device) generates log data D11 including status information data (status information) indicating the state of log items targeted for monitoring at a predetermined interval, and sends the generated log data D11 as a request to the maintenance server 17 (server). If the possibility of the state of a specific log item becoming an error is high, the POS terminal 13 shortens the predetermined interval at which the log data D11 is generated.

Thus comprised, for log items with a high possibility of going to an error state, the POS terminal 13 can report the state of the log item at a short interval to the maintenance server 17, and the maintenance technician, for example, can thereby monitor the state of the log item at the shortest interval possible and execute an appropriate process as required. More specifically, a system thus comprised that sends log data D11 from a client POS terminal 13 to a maintenance server 17 can execute processes appropriate to a configuration in which log data D11 is sent from POS terminals 13 to a maintenance server 17.

When the relationship between the numeric value of the status information data for a log item contained in the generated log data D11 is in a specific relationship to a specific threshold, the POS terminal 13 according to this embodiment of the disclosure determines the possibility of the state of the log item becoming an error is high, and sets the interval for generating the log data D11 shorter than the predetermined interval.

Thus comprised, the POS terminal 13 can appropriately determine if the possibility of the state of a log item becoming an error is high.

In this embodiment of the disclosure, the maintenance server 17 receives log data D11, and if the relationship between the numeric value of the status information data for a log item contained in the received log data D11 is in a specific relationship to a specific threshold, sends a response including information indicating the possibility of the state of the log item becoming an error is high to the POS terminal 13. When the POS terminal 13 receives a response including information indicating the possibility of the state of a log item becoming an error is high, the POS terminal 13 determines the possibility of an error occurring is high, and shortens the interval for generating the log data D11.

Thus comprised, the maintenance server 17 can appropriately determine if the possibility of the state of a log item becoming an error is high, and the POS terminal 13 can determine if the possibility of the state of a log item becoming an error is high based on the decision returned from the maintenance server 17.

If after setting the interval for generating log data D11 shorter than the predetermined interval the possibility of an error occurring is no longer high, the POS terminal 13 in this embodiment of the disclosure sets the interval for generating the log data D11 to a predetermined interval.

Thus comprised, the POS terminal 13 can be prevented from transmitting log data D11 at an unnecessarily short interval.

As described above, in this embodiment of the disclosure, a POS terminal 13 (control device) generates log data D11 including status information data (status information) indicating the state of log items targeted for monitoring, and sends the generated log data D11 as a request to the maintenance server 17 (server).

When log data D11 is received, the maintenance server 17 transmits a corresponding request, and stores the status information data contained in the received log data D11 to a first status information database 513 (first database). The maintenance server 17 then determines the class of the state of the log item based on the status information data contained in the received log data D11, and generates and stores processed status information including information indicating the class in a second status information database 514 (second database).

Thus comprised, based on the records in the first status information database 513, classifying the status of log items using conditions different from the conditions used to generate records in the second status information database 514, and other analyses of log item status, are possible. In addition, class information indicating the identified class can be added by a specific method to a specific record of the second status information database 514. Therefore, processes appropriate to the class of the state of the corresponding log item can be quickly executed, and the class of the state of a log item can be quickly reported, based on a specific record in the second status information database 514.

To generate the processed status information in this embodiment of the disclosure, the maintenance server 17 identifies the log item based on the status identification information contained in the status information, and determines the class of the status of the log item by a method appropriate to the log item.

Thus comprised, the maintenance server 17 uses the status identification information to appropriately identify the log item, and then classifies the status of the log item by a method corresponding to the log item.

When generating processed status information in this embodiment of the disclosure, if the value of the status identification information contained in the status information data is a value that indicates the status information data is information expressing the state of the log item by a numeric value, the maintenance server 17 determines the class of the status of the log item based on the relationship between the numeric value expressing the status of the log item and a specific threshold.

Thus comprised, the maintenance server 17 can appropriately determine the class of the status of the log item.

When generating processed status information in this embodiment of the disclosure, if the value of the status identification information contained in the status information data is a value that indicates the status information data is information expressing the state of the log item by a text string, the maintenance server 17 determines the class of the status of the log item based on the content of the text string expressing the status of the log item.

Thus comprised, the maintenance server 17 can appropriately determine the class of the status of the log item.

When generating processed status information in this embodiment of the disclosure, if the value of the status identification information contained in the status information data is a value indicating that determining the class of the status of the log item based on the status information data is not necessary, the maintenance server 17 stores processed status information not containing class information in the second status information database 514 (second database).

The disclosure is described above with reference to a preferred embodiment thereof, but the disclosure is not limited thereto and can be modified and adapted in many ways without departing from the scope of the accompanying claims.

The store system 11 according to the disclosure is applied by way of example to a store system above, but the enterprises in which the store system 11 may be used are not limited to stores.

In addition, any appropriate method of communication may be used by devices in the network system 1.

In addition, the POS terminal 13 records by a thermal recording method in the foregoing example, but the recording method is not so limited.

The function blocks described above with reference to the figures can be embodied as desired by the cooperation of hardware and software, and do not suggest a specific hardware configuration.

The function blocks shown in the accompanying function block diagrams illustrate the functional configurations of the devices, but the specific embodiments thereof are not so limited. More specifically, there is no requirement for hardware embodiments of the function blocks shown in the figures, and a configuration in which the functions of plural functional parts are rendered by a single processor executing one or more programs is obviously conceivable. Some functions embodied by software in the foregoing embodiment may also alternatively be embodied by hardware, and some functions embodied by hardware in the foregoing embodiment may also alternatively be embodied by software.

The disclosure being thus described, it will be obvious that it may be varied in many ways. Such variations are not to be regarded as a departure from the spirit and scope of the disclosure, and all such modifications as would be obvious to one skilled in the art are intended to be included within the scope of the following claims.

What is claimed is:

1. A network system, comprising:
    a control device configured to transmit a request; and
    a server connecting to the control device through a network and configured to transmit a response to a received request,
    wherein the control device is further configured to:
        set an interval for generating log data to a predetermined generating interval;
        set an interval for transmitting log data to a predetermined transmission interval;
        generate log data containing status information expressing the status of a log item targeted for monitoring the status thereof at the interval for generating log data;
        transmit the generated log data as the request to the server at the interval for transmitting log; and
        change according to a specific condition the interval for generating log data to another interval different than the predetermined generating interval and the interval for transmitting log data to another interval different than the predetermined transmission interval, wherein the specific condition includes a possibility of the status of the log item becoming an error,
    wherein when the possibility of the log item becoming an error is high, the control device sets the interval for transmitting log data shorter than the predetermined transmission interval, and
    wherein the status information of the log item contained in the log data is information indicating the status of the log item numerically, and when the relationship between a numeric value related to the status information of the log item contained in the generated log data and a specific threshold value is in a specific relationship, the control device determines that the possibility of the status of the log item becoming an error is high, and sets the interval for transmitting log data shorter than the predetermined transmission interval.

2. The network system of claim 1, wherein:
when the log data is received, and the relationship between a numeric value related to the status information of the log item contained in the received log data and a predetermined threshold value is in a specific relationship, the server sends to the control device a response including information indicating that the possibility of the status of the log item becoming an error is high; and
when a response including information indicating the possibility of an error occurring is high is received, the control device determines that the possibility of an error occurring is high, and sets the interval for transmitting log data shorter than the predetermined transmission interval.

3. The network system of claim 1, wherein:
when the possibility of an error occurring is no longer high after the interval for transmitting log data is set shorter than the predetermined transmission interval, the control device sets the interval for transmitting log data to the predetermined transmission interval.

4. The network system of claim 1, wherein the server is further configured to:
store contract period information indicating a period in which the control device can use a function of the server;
when the log data is received, determine based on the contract period information of the control device if the current time is within the period indicated by the contract period information,
if the current time is not within the period indicated by the contract period information, send to the control device a response including information indicating the current time not being in the period indicated by the contract period information, and
if the current time is within the period indicated by the contract period information, send to the control device a response including information indicating the current time being in the period indicated by the contract period information; and
when receipt of a response including information indicating the current time not being in the period indicated by the contract period information is the specific condition, the control device sets the interval for transmitting log data longer than the predetermined transmission interval.

5. The network system of claim 4, wherein:
when, after setting the interval for transmitting log data longer than the predetermined transmission interval in response to receiving a response including information indicating the current time not being in the period indicated by the contract period information, a response including information indicating the current time being in the period indicated by the contract period information is received, the control device sets the interval for transmitting log data to the predetermined transmission interval.

6. The network system of claim 4, wherein the control device is further configured to:

when log data is generated, store the generated log data and transmit the stored log data;
after transmitting the log data, delete the stored log data when information indicating the current time being in the period indicated by the contract period information is contained in a response received from the server in response to the transmitted log data;
when information indicating the current time not being in the period indicated by the contract period information is contained in response to the transmitted log data, target the log data for transmitting when transmitting the next request instead of deleting the stored log data; and
when the log data is received, determine based on the contract period information if the current time is within the period indicated by the contract period information,
acquire the log data and store information based on the acquired log data if the current time is within the period indicated by the contract period information, and
not store information based on the log data if the current time is not within the period indicated by the contract period information.

7. A control method of a network system including a control device configured to transmit a request, and a server connecting to the control device through a network and configured to transmit a response to a received request, the control method comprising:
setting, by the control device, an interval for generating log data to a predetermined generating interval;
setting, by the control device, an interval for transmitting log data to a predetermined transmission interval;
generating, by the control device, log data containing status information expressing the status of a log item targeted for monitoring the status thereof at the interval for generating log data;
transmitting, by the control device, the generated log data as the request to the server at the interval for transmitting log data; and
changing, by the control device, according to a specific condition the interval for generating log data to another interval different than the predetermined generating interval and the interval for transmitting log data to another interval different than the predetermined transmission interval, wherein the specific condition includes a possibility of the status of the log item becoming an error,
wherein when the possibility of the log item becoming an error is high, the control device sets the interval for transmitting log data shorter than the predetermined transmission interval, and
wherein the status information of the log item contained in the log data is information indicating the status of the log item numerically, and when the relationship between a numeric value related to the status information of the log item contained in the generated log data and a specific threshold value is in a specific relationship, the control device determines that the possibility of the status of the log item becoming an error is high, and sets the interval for transmitting log data shorter than the predetermined transmission interval.

8. A control device, comprising:
a controller configured to set an interval for generating log data to a predetermined generating interval, set an interval for transmitting log data to a predetermined transmission interval, generate log data containing status information expressing the status of a log item targeted for monitoring the status thereof at the predetermined generating interval; and a communicator configured to transmit the generated log data as a request to a server at the predetermined transmission interval, wherein the controller is configured to change according to a specific condition the interval for generating log data to another interval different than the predetermined generating interval and the interval for transmitting log data to another interval different than the predetermined transmission interval, wherein the specific condition includes a possibility of the status of the log item becoming an error wherein when the possibility of the log item becoming an error is high, the controller sets the interval for transmitting log data shorter than the predetermined transmission interval, and wherein the status information of the log item contained in the log data is information indicating the status of the log item numerically, and when the relationship between a numeric value related to the status information of the log item contained in the generated log data and a specific threshold value is in a specific relationship, the controller determines that the possibility of the status of the log item becoming an error is high, and sets the interval for transmitting log data shorter than the predetermined transmission interval.

9. The control device of claim 8, wherein:

when a response including information indicating the possibility of an error occurring is high is received by the server, the controller determines that the possibility of an error occurring is high, and sets the interval for transmitting log data shorter than the predetermined transmission interval.

10. The control device of claim 8, wherein:

when the possibility of an error occurring is no longer high after the interval for transmitting log data is set shorter than the predetermined transmission interval, the controller sets the interval for transmitting log data to the predetermined transmission interval.

11. The control device of claim 8, wherein:

when receipt of a response from the server including information indicating a current time not being in a contract period in which the control device can use a function of the server is the specific condition, the controller sets the interval for transmitting log data longer than the predetermined transmission interval.

12. The control device of claim 11, wherein:

after the controller sets the interval for transmitting log data longer than the predetermined transmission interval, when the communicator receives the response including information indicating the current time being in the contract period, the controller sets the interval for transmitting log data to the predetermined transmission interval.

13. The control device of claim 11, the control device comprising, a memory configured to store the generated log data by the controller, and wherein:

after the communicator transmits the stored log data to the server, when the communicator receives the response including information indicating the current time being in the contract period, the controller deletes the stored log data in the memory, when the communicator receives the response including information indicating the current time not being in the contract period, the controller keeps the stored log data in the memory, and targets the log data for transmitting when transmitting the next request.

14. The network system of claim 1, wherein the log item includes at least one of memory usage, controller usage, controller temperature and data transfer rate.

15. The control device of claim 8, wherein the log item includes at least one of memory usage, controller usage, controller temperature and data transfer rate.

* * * * *